(12) United States Patent
Bander et al.

(10) Patent No.: US 7,248,463 B2
(45) Date of Patent: Jul. 24, 2007

(54) IMPRESSION CREATING DEVICE AND METHOD FOR A LAPTOP COMPUTER

(75) Inventors: Kevin S. Bander, New York, NY (US); Alvaro Acosta, Chatham, NJ (US); Alberto Mantilla, Rego Park, NY (US); Anthony Baxter, Hoboken, NJ (US); Antonio Hernandez, New York, NY (US); Adriana Kliegman, New York, NY (US); Diana Sierra, Fairview, NJ (US)

(73) Assignee: LapOn, L.L.C., New York, NY (US)

( * ) Notice: Subject to any disclaimer, the term of this patent is extended or adjusted under 35 U.S.C. 154(b) by 257 days.

(21) Appl. No.: 11/064,106

(22) Filed: Feb. 23, 2005

(65) Prior Publication Data

US 2006/0193109 A1 Aug. 31, 2006

Related U.S. Application Data

(60) Provisional application No. 60/546,871, filed on Feb. 23, 2004.

(51) Int. Cl.
*G06F 1/16* (2006.01)
(52) U.S. Cl. ................................ 361/681; 361/683
(58) Field of Classification Search ................. 361/681
See application file for complete search history.

(56) References Cited

U.S. PATENT DOCUMENTS 5,077,925 A 1/1992 Herrera et al.

(Continued)

FOREIGN PATENT DOCUMENTS

| EP | 1118926 | 7/2001 |
| EP | 1331544 | 7/2003 |
| GB | 1501013 | 2/1978 |
| JP | 3-143409 | 6/1991 |
| JP | 9-108024 | 4/1997 |

OTHER PUBLICATIONS

Barry McConaghy, [ILUG] laptop stickers, Nov. 5, 2002, 1 page, ILUG Historical Archive.

(Continued)

*Primary Examiner*—Jayprakash Gandhi
*Assistant Examiner*—Anthony Q Edwards
(74) *Attorney, Agent, or Firm*—Schwartz Cooper Chartered

(57) ABSTRACT

An impression creating apparatus or image display and method for a laptop computer is disclosed. The laptop computer has a cover panel with an exposed outer surface and a screen on an interior portion. The exposed outer surface of the laptop computer cover panel has a peripheral edge. The image display has a frame, a means for attaching the frame to the exposed outer surface of the laptop's cover panel, and an impression creating layer or image insert. The device can also have a translucent cover. The frame has a border at least partially surrounding a compartment. The image insert can be inserted into the compartment for creating the impression. The translucent cover can overlay at least a portion of the image insert. The method allows an individual and/or entity to attach the frame of the image display to the back side of the display housing of the laptop computer with the means for attaching, select an image insert for inserting into the frame based on a target audience that will be able to see the selected image insert within the frame on the back side of the display of the laptop after revealing the laptop to the target audience, insert the selected image insert into the frame, and display the laptop computer and the selected image insert within the frame to the target audience.

23 Claims, 26 Drawing Sheets

U.S. PATENT DOCUMENTS

| | | | |
|---|---|---|---|
| 5,592,361 | A | 1/1997 | Smith et al. |
| 5,639,004 | A | 6/1997 | Carlton et al. |
| 5,682,993 | A | 11/1997 | Song |
| 5,701,230 | A * | 12/1997 | Liang et al. ............... 361/681 |
| 5,870,282 | A * | 2/1999 | Andre et al. ............... 361/683 |
| 5,877,896 | A | 3/1999 | Gremban |
| 5,931,297 | A | 8/1999 | Weill et al. |
| 5,938,096 | A | 8/1999 | Sauer et al. |
| 6,052,933 | A * | 4/2000 | Lytle ........................... 40/711 |
| 6,149,001 | A | 11/2000 | Akins |
| 6,173,837 | B1 | 1/2001 | Marconi |
| 6,400,562 | B1 | 6/2002 | Lee et al. |
| 6,504,706 | B2 | 1/2003 | Stewart |
| 6,520,607 | B2 | 2/2003 | Pfaff |
| 7,031,148 | B1 * | 4/2006 | Lin ........................... 361/683 |
| 2001/0009498 | A1 * | 7/2001 | Oross et al. ............... 361/681 |
| 2001/0037593 | A1 | 11/2001 | Korpai |
| 2003/0095373 | A1 | 5/2003 | Duquette |
| 2003/0134613 | A1 | 7/2003 | Latto et al. |
| 2003/0147208 | A1 | 8/2003 | Kim |
| 2004/0022021 | A1 | 2/2004 | Bovino |
| 2004/0066613 | A1 | 4/2004 | Leitao |

OTHER PUBLICATIONS

Modkid, Case Accessories: PolyGFX Laptop Skin, May 2, 2004, 9 pages, BurnOutPC.com.

Joi Ito, Stickers on our Powerbooks, Sep. 8, 2004, 7 pages.

Mac Stickers' laptop photos, Nov. 18, 2004, 6 pages, Flickr.

RIAA Sticker, Nov. 18, 2004, 2 pages, Think Geek.

The Enlightenment Project: Sticker, Nov. 18, 2004, 1 page, cafepress.com.

Tim Burlowski, Timbu :: Musings ; laptop stickers, Nov. 18, 2004, 3 pages.

Cory at SXSW 2004, Nov. 18, 2004, 2 pages, Flickr.

WarDriver Vinyl Stickers, Nov. 18, 2004, 2 pages, www.staticusers.net.

How To Customize Your Notebook, Nov. 18, 2004, 3 pages, Bay Wolf.

Quickstickers, Nov. 18, 2004, 4 pages, www.quickstickers.com.

Yellow Zipper Pokemon Laptop, Nov. 18, 2004, 4 pages, FJ!!'s Hierarchy.

Pink Hello Kitty Laptop, Nov. 18, 2004, 4 pages, FJ!!'s Hierarchy.

Hacker Stickers Computer Stickers for Geeks, Nerds, and Computers, Nov. 18, 2004, 3 pages, www.hackerstickers.com.

"Daemon Inside" Mac Laptop Sticker, Nov. 18, 2004, 2 pages, BSD Mall, Nauvoo, IL.

Notification of Transmittal of the International Preliminary Report on Patentability, and International Preliminary Report on Patentability completed Jun. 19, 2006 for PCT/US2005/005664 filed Feb. 23, 2005.

* cited by examiner

IMPRESSION CREATING DEVICE AND METHOD FOR A LAPTOP COMPUTER

CROSS-REFERENCE TO RELATED APPLICATIONS

This application claims the benefit of provisional application Ser. No. 60/546,871, filed Feb. 23, 2004, the entire contents of which is hereby incorporated by reference as if fully set forth herein.

TECHNICAL FIELD

The present invention relates to devices used to create impressions and to laptop computer. More particularly, the present invention relates to an image impression or appearance enhancement devices, and methods for using such devices.

BACKGROUND OF THE INVENTION

Over the past decade, laptop computers (otherwise known as notebook computers, or simply as "laptops") have become one of the largest categories of computer sales. In 2005, 195 million personal computers are projected to be sold worldwide, with laptops having a significant percentage of these sales.

Due to the light weight and smaller size of laptops relative to desktop computers, individuals are able to transport laptop computers from work to home and utilize them at almost every location. Laptops generally have a cover panel hinged to a lower portion. The cover panel has an inner surface comprising a flat screen monitor when hinged open and an outer surface that protects the keyboard and the flat screen monitor when the cover panel is hinged closed. Because laptops are frequently moved from location to location, the laptop cover panel is subject to scratches and nicks. Many, if not all laptop cover panels become scratched and nicked during their life span.

To protect against nicks and scratches and to provide some individuality and customization to the cover panels, many users decorate their laptop's cover panel with indicia such as artwork, for example decals, paint, etc. However, it has been found that decals leave a residue on the cover panel when removed, and paint and the like permanently disfigure the cover panel. Neither allows individuals to easily or quickly change the image they are seeking to display. One such device is shown in U.S. Pat. No. 6,520,607 B2 to Pfaff, which discloses a laptop computer appearance enhancement device for enhancing the appearance of laptop computer lid. Decals and/or stickers can be directly applied to the laptop computer lid, and an alignment device can be used to assist in aligning the sticker/decal on the lid. This arrangement does not allow for mediums of expression to be easily interchangeable. This arrangement will also cause adhesive residue when a user wants to change the decal and/or sticker. U.S. Pat. No. 5,870,282 also discloses an enclosure panel for a mobile computer, which can have a transparent enclosure panel housing which is a part of the mobile computer. Objects, such as photographs can be placed under the transparent enclosure panel housing. However, removal and changing of such objects appears to possible through complete removal of the transparent enclosure panel housing, a permanent part of the mobile computer.

The present invention is provided to solve the problems discussed above and other problems, and to provide advantages and aspects not provided by the known prior covers panels of this type. A full discussion of the features and advantages of the present invention is deferred to the following detailed description, which proceeds with reference to the accompanying drawings.

SUMMARY OF THE INVENTION

The present invention is directed to a an impression creating device for a laptop computer. The device can also serve protective functions as well as other functions. Typical laptop computers have a display having a outer cover panel and a screen, the outer cover panel having an exposed outer surface. The display is hinged to a body member housing a keyboard, the screen and the keyboard being visible when the display is opened. The cover panel has a peripheral edge. The enhancement device or image creating device has a frame for attaching to the exposed outer surface of the cover panel. The frame has a border at least partially surrounding a compartment. An adhering mechanism is provided for attaching the frame to the exposed outer surface of the cover panel. The device also has an impression creating layer for insertion into the compartment.

The present invention is also a method of using an image display or impression creating device. As indicated, the image display has a frame, means for removeably attaching the frame to a back side of a display housing of the laptop computer, and an image insert for insertion into the frame. The method of use comprises providing the laptop computer, providing the image display, and attaching the frame of the image display to the back side of the display housing of the laptop computer with the means for attaching. A image insert is selected for inserting into the frame based on a target audience that will be able to see the selected image insert within the frame on the back side of the display of the laptop after revealing the laptop to the target audience. The image insert is then inserted into the frame, and the laptop computer is diplayed with the selected image insert within the frame being visible to the target audience for creating an impression with the selected image insert upon the target audience.

The present invention will provide these and other advantages and functions, as will be understood with reference to the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
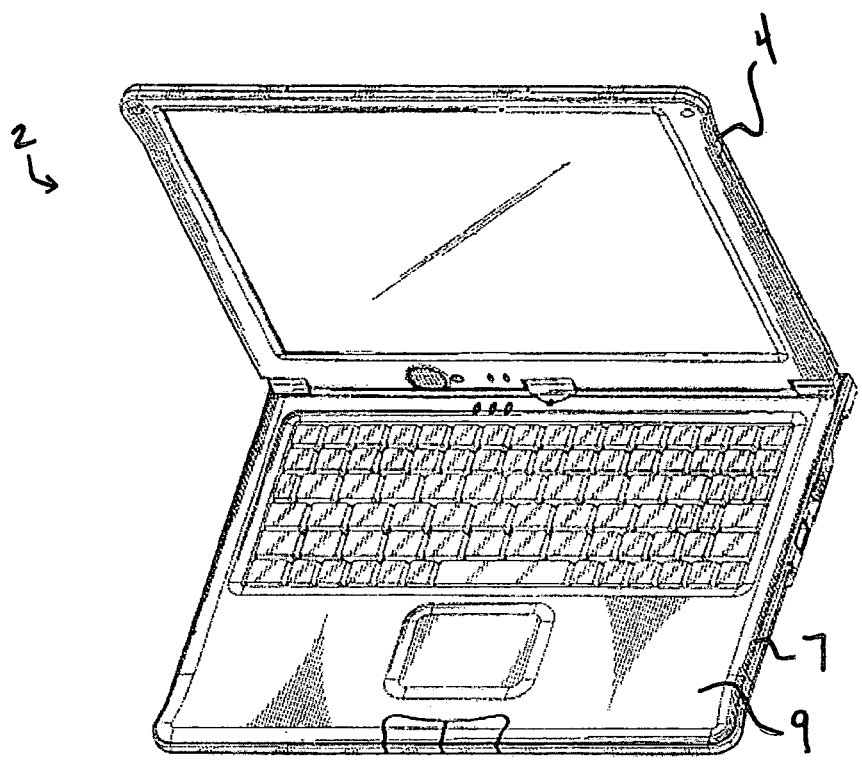
FIG. 1 is a perspective view of a laptop used in conjunction with the enhancements of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention enables laptop computer owners the ability to at least create an impression on others and to protect the front or outer surface of the laptop's cover panel against scratches, nicks or other damage through the use of a display device or apparatus that adheres to the cover panel via various attachment means such as glue, adhesive, hook and latch, VELCRO, snaps, buttons and/or other similar attachment means. The invention preferably covers a significant percentage of the laptop cover whether the laptop is completely flat or has curvatures or contours. The laptop display device is stationary and may include a pocket, compartment, or other storage/holding area so that individuals and/or entities can easily place and/or slide in and out new customized or stock images, designs or expressions quickly and easily. However, while the present invention is described in conjunction with a laptop computer, one of ordinary skill in the art would recognize that the present invention can be used in conjunction with numerous other electronic devices such as PDAs, MP3 players, digital cameras and other computer related devices such as flat panel monitors, computer monitors, medical devices, point of sale terminals, which shall be referred to as laptop computer devices as well for the purpose of this specification.

The present invention is a personalization/communication tool that enables people to customize their laptops, and it is also an outstanding marketing tool for businesses. In addition to preserving the laptop from scratches, nicks or other damage, the display or impression creating device provides various means for the user to express one's personality or preferences through unique artistic designs, logos, photographs, holograms, metallic, cellophane, gummed paper or other expressions of ideas exhibited on a media layer or image insert. The protective device or sheet allows users to express their unique personality or preference as well as providing other significant utility. Thus, the present invention provides a new mode of communication for people and companies and empowers people and companies to express themselves and communicate to others through the display device being attached to the back or cover panel of their laptop. Because the display device can be opened and closed to remove and securely fit and hold sheets, such as paper, it enables individuals to customize the back housing of their laptops.

The present invention allows companies to convert their existing company purchased assets (laptops) into marketing tools (like a brochure/business card). This empowers them to convert an ordinary business tool into a marketing medium, similar to a roving moving billboard, and maximize their investment in their laptop purchases. The present invention can therefore transform all otherwise ubiquitous laptop computers, through the use by their laptop toting employees, into prime advertising and marketing space and tools. Thus, in one form of the present invention, the impression creating device is a mobile advertising/marketing device.

The invention provides for a software application to enable a user to create designs or import photographs directly onto a sheet that fits into the frame of the display device attached to the laptop size. This enables both large and small businesses the ability to quickly and easily create customized design advertisements, company logos or other designs to promote their company by using the laptop device, to which the display device is attached.

The invention further allows for the ability to have an electronic sheet adhered directly to the laptop cover panel for the creation of advertising or changes to the laptop cover electronically. The user is able to create directly from their laptop or computer the electronically generated message.

The invention encompasses a sheet that covers the top surface of the laptop. The invention is reusable. The sheet and/or device can be "pulled" on and off again from the cover. The image inserts are interchangeable in that the user may slide the image inserts upon which designs, photos, etc. are printed or placed. The present invention also includes a frame that allows users to insert image inserts such as photographs, printed sheets of paper or laminated boards, into it. The frame adheres directly to the cover of the laptop.

The frame takes into account that a laptop may be stuffed into and taken out of a briefcase many times. The means for attaching the frame to the laptop is strong enough to adhere to the laptop for the life of the laptop, but also has the ability to remove the frame if necessary.

A translucent cover can be used to cover the image insert when the image inert is inserted into the frame. The cover can be dry erase, colored, metallic or some other form. The image insert can have an locking mechanism to secure the image insert to the frame. The cover can also have a locking mechanism to the secure the cover to the frame. The cover can be permanently hinged to the frame as well. The loc king mechanism should be easy to open and close for ease of inserting and removing the image inserts.

In one form of the present invention the image insert can be a "white board" which can be inserted to use to create an impression by drawing on it after display of the image display on the cover of the laptop to the target audience.

Any image insert or media bearing layer that inserts/snaps into the frame can be significant. The image insert may contain a graphic that will allow the user to change the look and/or feel of the laptop.

Both the frame and the insert can be made from materials that are flexible enough to hug the curvature of the many laptop models.

The present invention allows users to have a single frame, but many image inserts and/or media inserts for as many impressions a user desires to display and/or convey.

Figure 6:
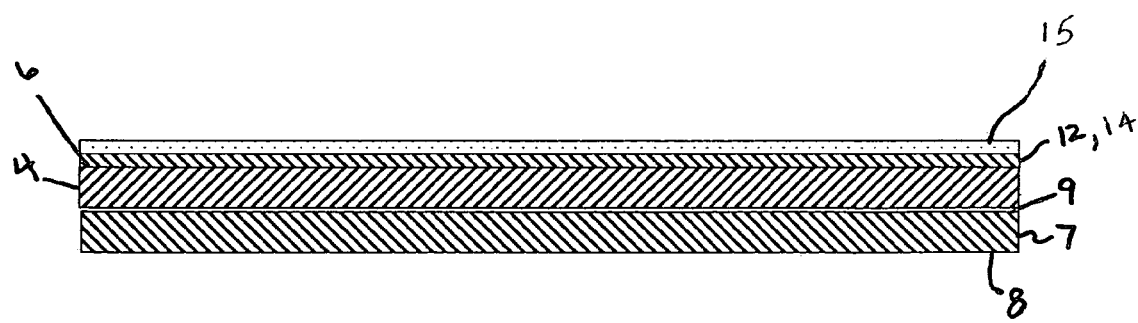
FIG. 6 is a partial cross-sectional view of the first embodiment of the present invention.

Referring now to the Figures, several embodiments of a laptop computer and flat panel computer monitor protector and visual enhancement device and/or image display (the "enhancement") are illustrated. The laptop computer 2 includes a cover panel 4, generally a display housing, having a top or outer surface 6 opposite a computer screen or display. (See FIGS. 1, 2, and 6). The cover panel 4 is hinged to a lower body member 7 having an exterior surface 8 forming a base for supporting the laptop and a interior surface 9 including a keyboard. The hinge allows the cover panel 4 to be lifted to a generally vertical position. The exposed outer surface 6 of the cover panel 4 has a peripheral edge defining the circumference or perimeter of the outer surface 6.

Referring to FIGS. 2-5, an enhancement device or impression creating device 10 comprises a first layer of material 12 and a media or second layer of material 14. The first and second layers 12 and 14 are attachable via any suitable removable attachment means 16, such as hook and latch, adhesive, male/female connections, magnets, hooks, screws, slot/inserting arrangement, etc. The attachment means is preferably reusable and easily workable to allow the second layer 14 to be simply and easily removed from the first layer 12.

Figure 2:
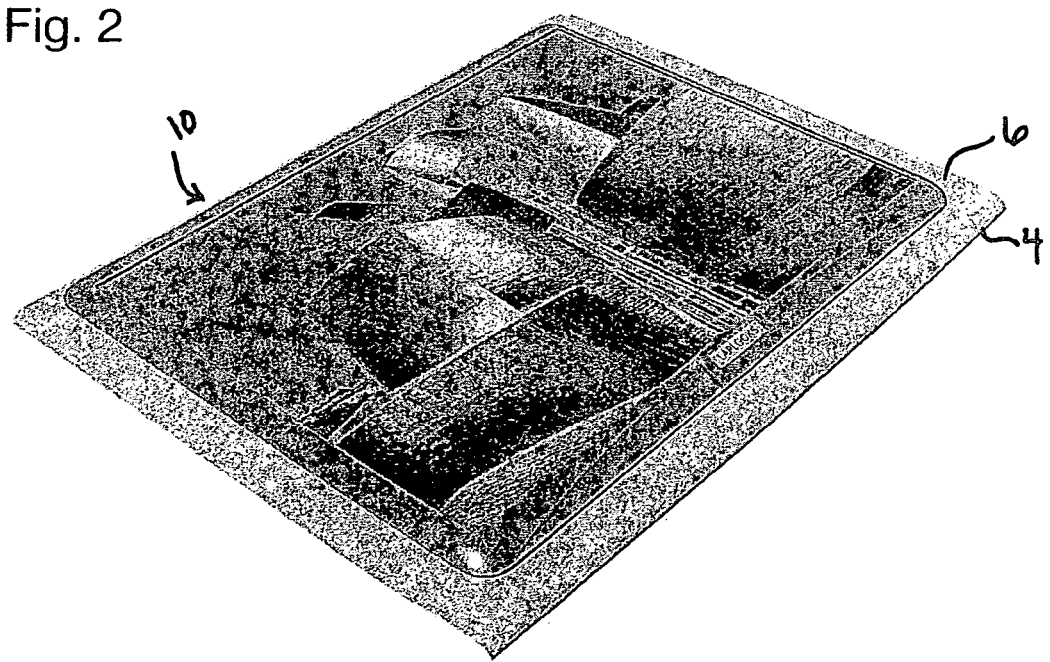
FIG. 2 is a perspective view of the present invention removably attached to the cover panel of a laptop computer; each of the embodiments of the present invention are attachable to the cover panel of a laptop computer and many are designed conform to the contour of variously designed cover panels.
Figure 3:
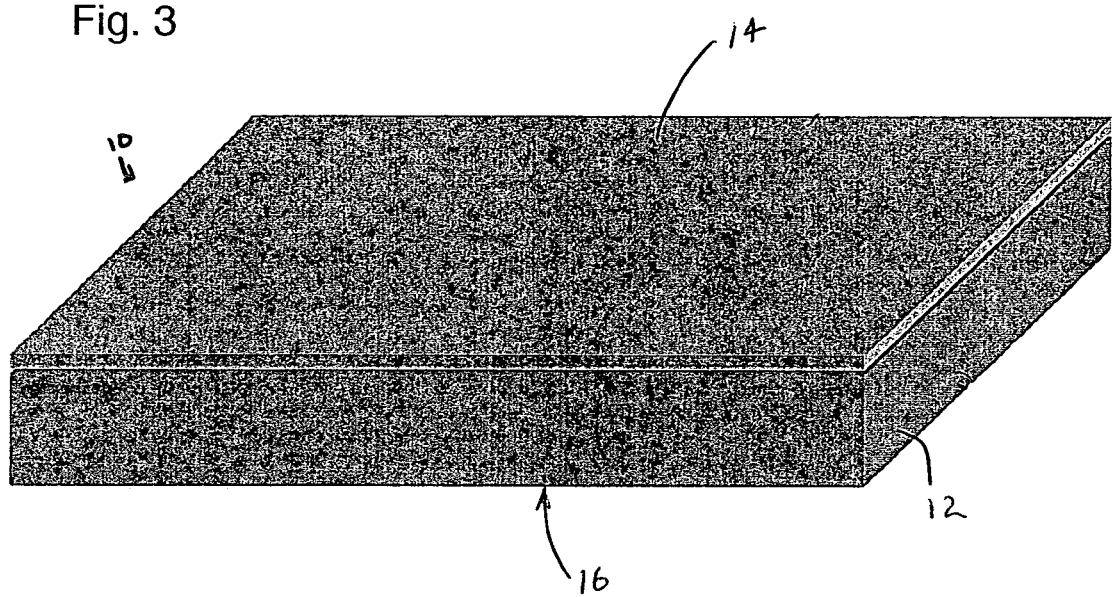
FIG. 3 is a perspective view of a first embodiment of the present invention.
Figure 4:
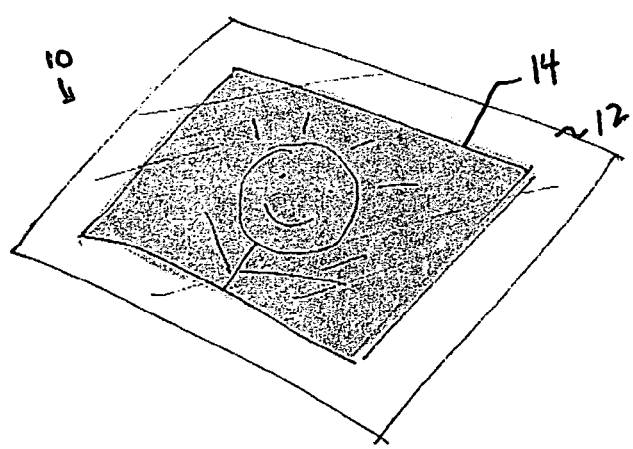
FIG. 4 is a perspective view of a variation of the first embodiment showing a impression creating layer or image insert.
Figure 5:
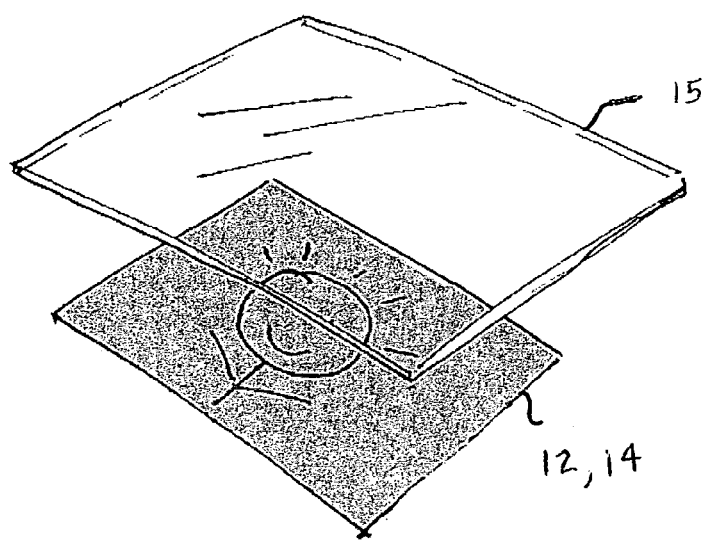
FIG. 5 is a perspective view of the first embodiment showing separable first and second layers.

The first layer of material is generally a cloth, such as felt, or a plastic, metallic, paper or otherwise flat surface sheet ranging from 0.01 mm to 2.0 mm thick, but can include any thin layer of various polymers, papers, acetate, polyurethane, photographs, foils, velour, felt, metallic film/foil, gels, heat-sensitive materials that change colors, or fluorescent tops. This first layer 12 adheres directly to the laptop 2, preferably to the top or outer surface 6 of a cover panel 4 of the laptop 2. The first layer may be attached by any suitable means, including adhesives (glue, epoxy, tape, etc.), hook and latch sections, interlocking pads, magnetism, or any of the other suitable attachment means set forth herein or otherwise known in the art. The first layer 12 may cover the entire outer surface 6 of the cover panel 4. The first layer can be a frame, as shown in FIG. 2, and can have a hollowed out central portion as the first layer, or can be a continuous piece of material as the first layer. The first layer 12 may be removable but is solidly secured despite the contour of the laptop 2 cover panel 4 (with or without curves, concave, or other). The attachment means is applied to a contact surface 16 of the first layer 12.

The second layer of material 12, 14, may be on the opposite side of the contact surface, but more preferably is a separate member overlaying at least a portion of the first layer 12. This second layer 12, 14 is preferably a graphic layer, such as a sheet of paper 12 with a design 14 on it. Accordingly, the second layer 12, 14 may be a media layer and, thus, comprise a display surface including some expression of an idea, such as a photo or other artistic expression. The second layer 12, 14 can be, or include indicia such as, a photograph, design, advertisement, company logo or design within a hologram, a photograph in a hologram, mirrored material, a mirror, foil, glow in the dark material, beads, yarn, gel, velour, calendar (monthly, yearly, weekly or other), circular object, a letter, a number, a dry erase board, colored sheet, cardboard, poster board, or any appropriately-dimensioned object a user might desire to display. The hologram design may adhere directly to the outer surface 6 of the laptop 2, and be one or more of the following group: company logos, advertising, photographs, photographs with holograms, words, numbers, images, and/or designs. It should be understood that the media layers described herein may be applied by any of the various methods by which design/graphic transfer and imprinting may be done, all of which are known in the prior art and would be usable by one skilled in the art, including electronic transfer. A translucent cover 15 can be used over the second layer 12, 14.

The second layer 12, 14 may also include a whiteboard where the user can write/draw characters on the back of the laptop with a dry erase marker pen or chalk, a 3-dimensional design, words, logo or other. The second layer 14 is attached the first layer 12 using any attachment means described herein or otherwise known in the art.

Figure 7:
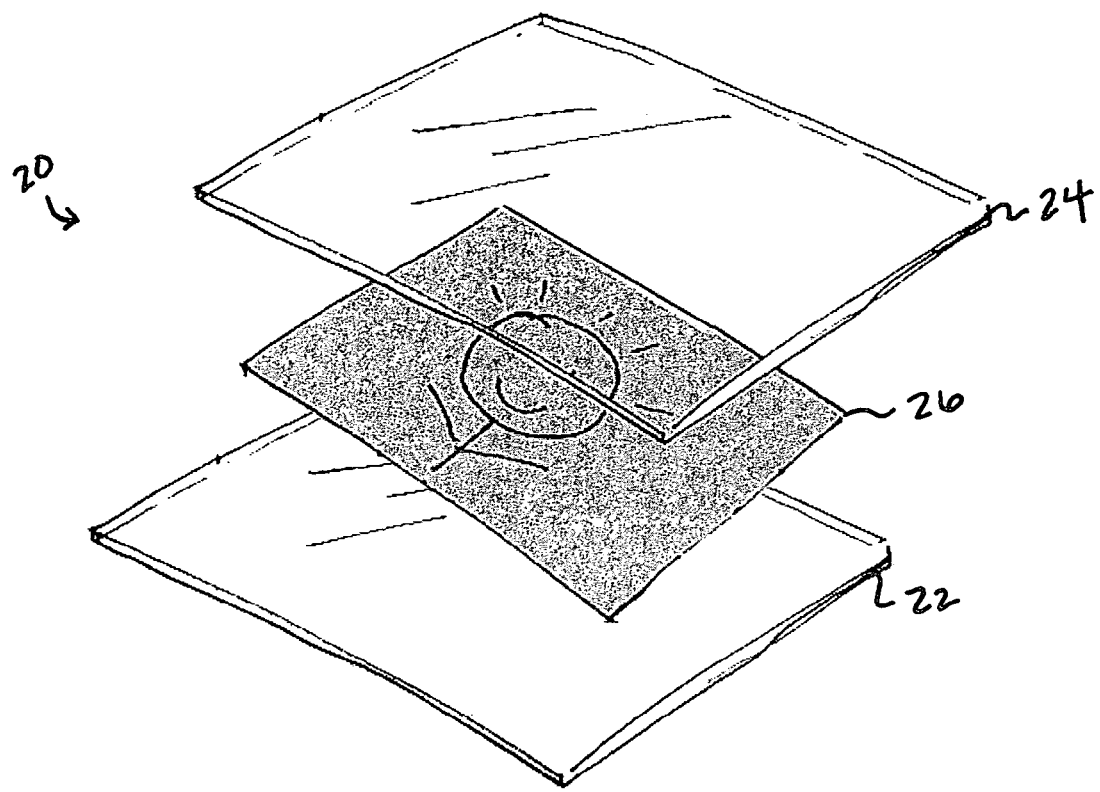
FIG. 7 is a perspective view of a second embodiment of the present invention.

Referring to FIG. 7, a second embodiment of an enhancement 20 of the present invention is illustrated. In this embodiment, the enhancement 20 has first and second layers 22, 24. One or more additional media or graphic layers 26 overlay at least a portion of the second layer 24. Here, one or more of the additional layers 26 are peelably attached to the second layer 24 so the additional layers 26 can be peeled off to a display a separate expression of an idea, new image, design, logo, etc. Accordingly, in this embodiment the second layer 24 and the additional layers 26 may, for example, be selected from the following group: a photograph, a design, an advertisement, a company logo or design within a hologram, a photograph in hologram, a mirrored material, a foil, a glow in the dark material, beads, yarn, gel, velour, a calendar (monthly, yearly, weekly or other), a whiteboard, or others. These layers may also be 3 dimensional designs, words, logos or other.

Figure 8:
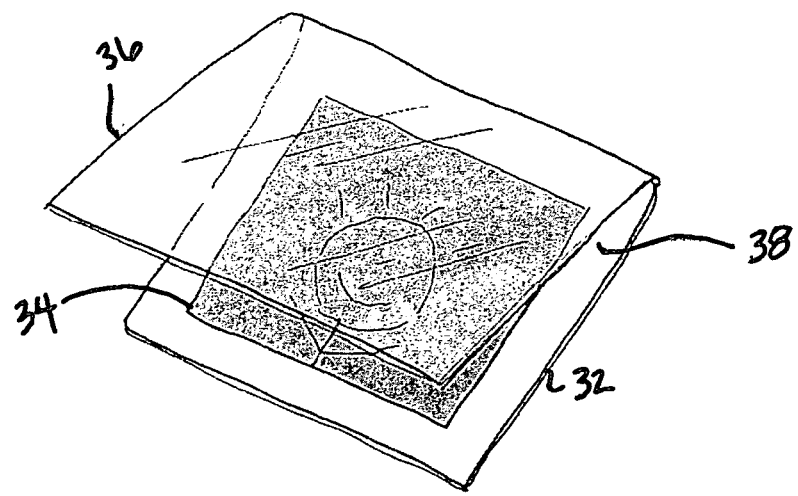
FIG. 8 is a perspective view of a third embodiment of the present invention.

Referring to FIG. 8, a third embodiment of an enhancement 30 of the present invention is illustrated. This embodiment includes first, second and third layers 32, 34, 36. The first and third layers 32, 36 form a pouch or pocket 38. The third layer 36 is generally translucent, preferably clear, and is adapted and sized to receive the second layer 34. The pouch is generally flat and is made of a material preferably ranging from 0.01 mil of thickness to 2.0 mil of thickness. The first layer 32 is attached to the outer surface 6 of the cover panel 4 using any suitable attachment means described herein. This enables a bottom portion of the pouch 38 to overlay the cover panel 6 of the laptop 2 and securely adhere to it. The user then slides the media or second layer 36 comprising any of the expressions of ideas previously described within the pouch 38. The translucent nature of the third layer 36 allows the graphics to be seen. The second layer may be selected from any of the materials previously described.

Figure 9:
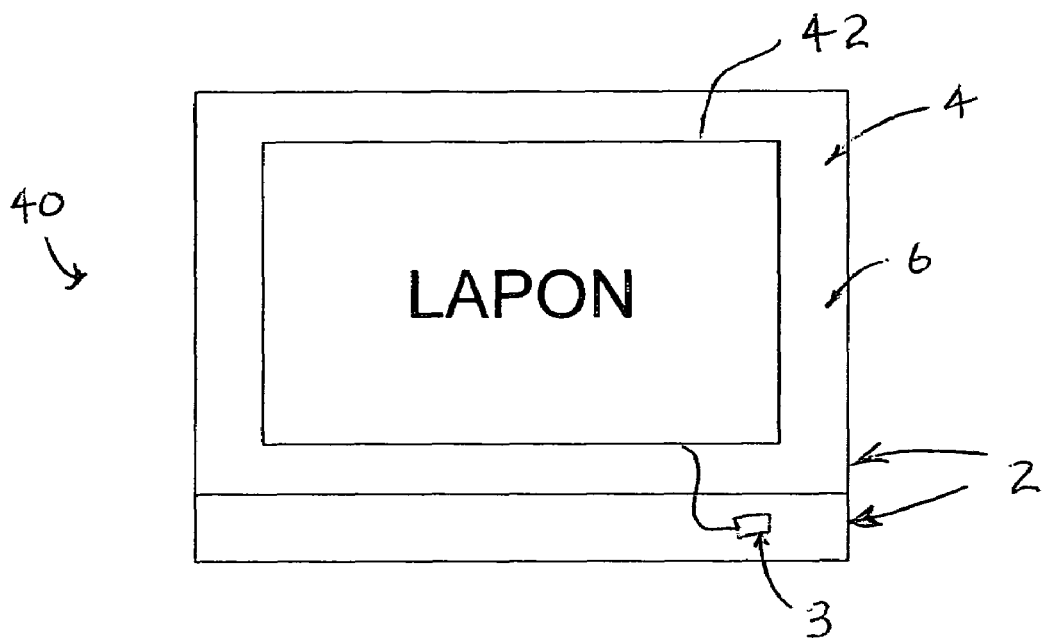
FIG. 9 is an illustration of a fourth embodiment of the present invention.

Referring to FIG. 9, a fourth embodiment of an enhancement 40 is illustrated. In this embodiment, a removable electronic display means 42 is attached to the outer surface 6 of the cover panel 4 using any of the suitable attachment means set forth herein or known in the art. The display means 42 connects to a port 3 of the laptop 2, enabling the user to type a message on the laptop's keyboard and have the image, such as a digital image, appear on the display means 42 facing an audience. In this embodiment, the user has typed a trademark "LAPON." This enhancement 40 is ideal for companies wanting to advertise an electronic or moving image on the back of its computer laptops. This is also ideal for an individual who wishes to have expressions, designs, or other electronically displayed on the back of his/her laptop. This enhancement 40 also allows two or more people to collaborate on a document, allows advertising, allows electronic messages to be displayed, and/or allows changing images (similar to a screen saver).

The enhancement 40 can be used in conjunction with a software program that includes what is commonly known as a bar code or radio frequency identification (RFID) tracking. A bar code can be placed on the display device and a particular laptop can be associated with the bar code on the display device attached to such laptop. This enables companies to track the laptops easily and quickly assign company-tracking information to the laptop that can be removed. The present invention can also track laptops using, for example, an embedded code (RFID) inside the protector in a similar fashion. The software program tracks the laptop computer pursuant to the identification information on or in the display device attached to the laptop. Users of such laptops can be associated with this identification information as well. The software program also allows for users to create, import, and/or export one or more of the following group: company logos, identifiers, words of expression, graphics, artwork, colored designs, calendars, photographs with or without frames, photographs range in sizes from 1 in.×1 in. to 10 in.×17 in. or any size range therein. It also enables users to input multiple photographs. In addition, one can create designs and photos or other.

Figure 10:
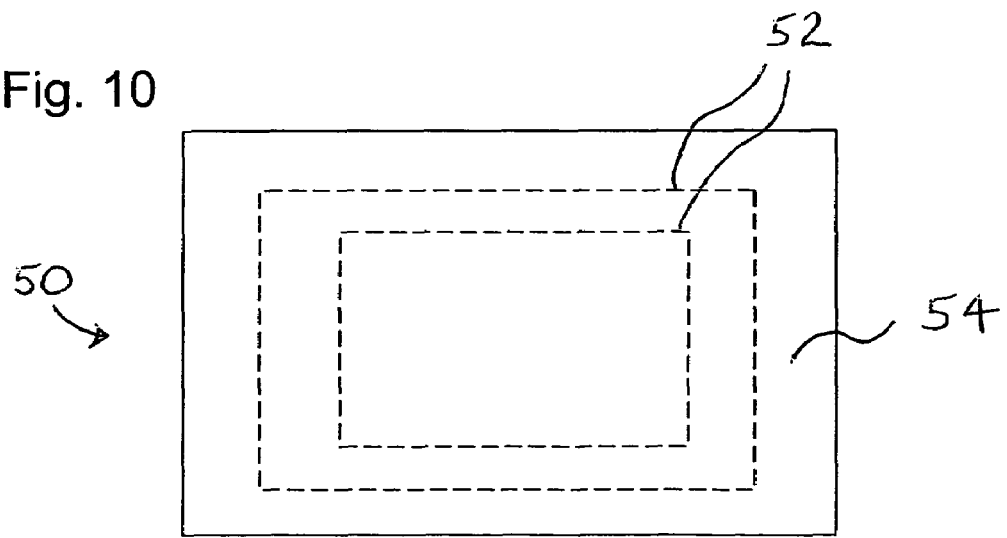
FIG. 10 is an illustration of a fifth embodiment of the present invention illustrating a method for sizing an enhancement.

Referring to FIG. 10, this illustration depicts a method for sizing an enhancement 50 of the present invention for a customized fit to multiple sizes of computers. It provides for a means for easily lining up the enhancement 50 to fit the precise size of the laptop cover 6. This provides for lines or perforations 52 on a contact surface 54 that enable the user to accurately cut with scissors or other sharp object to the appropriate size of the laptop. Then, a first layer can be attached to the laptop while a second layer can overlay the first layer.

Figure 11:
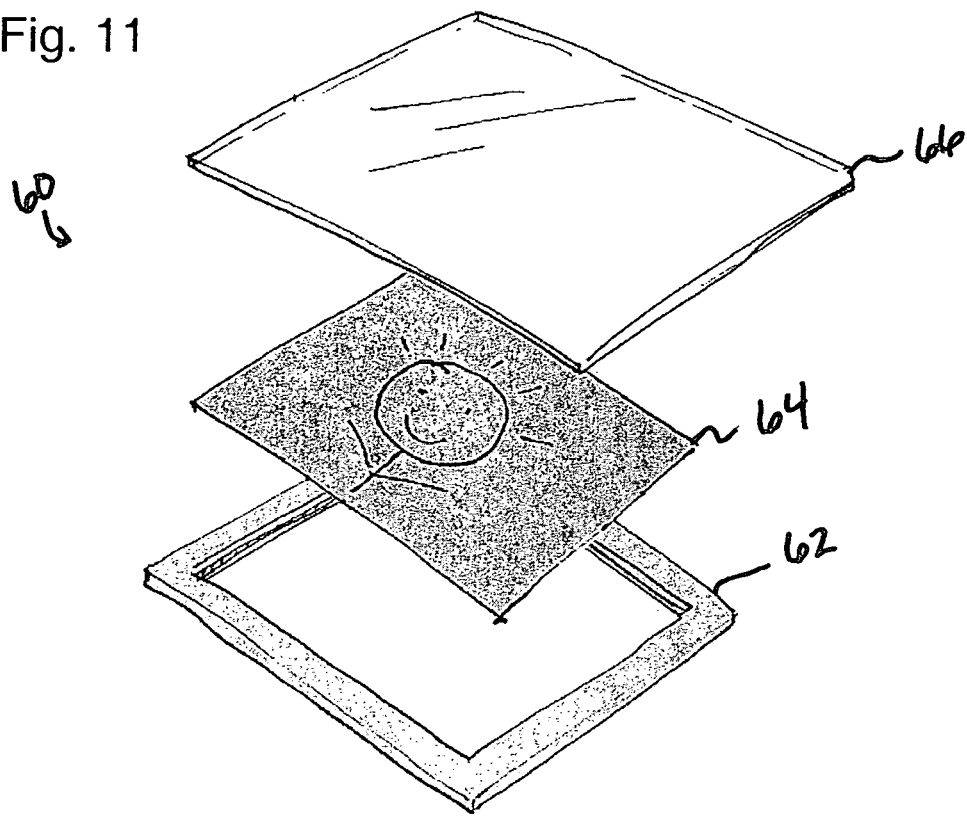
FIG. 11 is a perspective view of a sixth embodiment of the present invention.

Referring to FIG. 11, a sixth embodiment of an enhancement 60 of the present invention is illustrated. The enhancement 60 includes a first layer in the form of a frame 62, a media or second layer 64, and an optional third layer 66. The frame 62 is attached to the outer surface 6 of the cover panel 4. The second layer 62, including some expression of an idea, is fit within the frame 62. The translucent, preferably clear, third layer or cover 66 is press fit within the frame 62 to retain the second layer 64 within the frame 62.

It should be understood that the frame 62, and any other frames described herein, can be produced from rigid polymeric materials, metals, and/or synthetic or natural rubbers.

Rigid polymers can be molded to any shape, can take any color, but are potentially brittle. Metals have many available finishes and are attractive, but may scratch and could be heavy. Rubbers, and suitably pliable polymers, are preferable. These materials can conform to almost any shape, resist bumps and knocks, are lightweight, less likely to scratch, and are pliable, formable or deformable.

Furthermore, the frames described herein generally include a perimeter border at least partially surrounding, preferably defining, an accessible compartment, allowing the media layers to be changed when necessary or desired. The frames of the present invention fit atop and are attached to the outer surface 6 of a laptop's cover panel, shown in previous FIGS. A benefit of attaching the frame in this location atop the outer surface eliminates the need for special sizing of the frame dependent on the dimensions of the laptop's cover panel, most notably the circumferential characteristics, including length and shape, of the peripheral edge of the outer surface 6 of the cover panel 4, shown in previous FIGS.

The cover layer 66, and any other cover layers described herein, may be produced from a rigid polymeric material for strength, and be molded to conform to the contour of the laptop. However, the cover 66 is preferably formed from a flexible polymeric material. The advantage of a flexible polymer cover 66 is that the cover 66 easily conforms to multiple laptop contours, and the flexible cover 66 is thinner than a rigid cover. The rigid cover 66 may also show scratches where the flexible cover 66 would be less likely to show scratches and could be more cost effectively replaced.

The covers of the present invention may be integrally formed with the corresponding frames. Alternatively, the covers can be separate members that removably attach to the frame. In either case, the cover protects the media layer and the outer surface of the laptop's cover panel and allows for easy access to the media layer for changing the media layer when necessary or desired.

Figure 12:
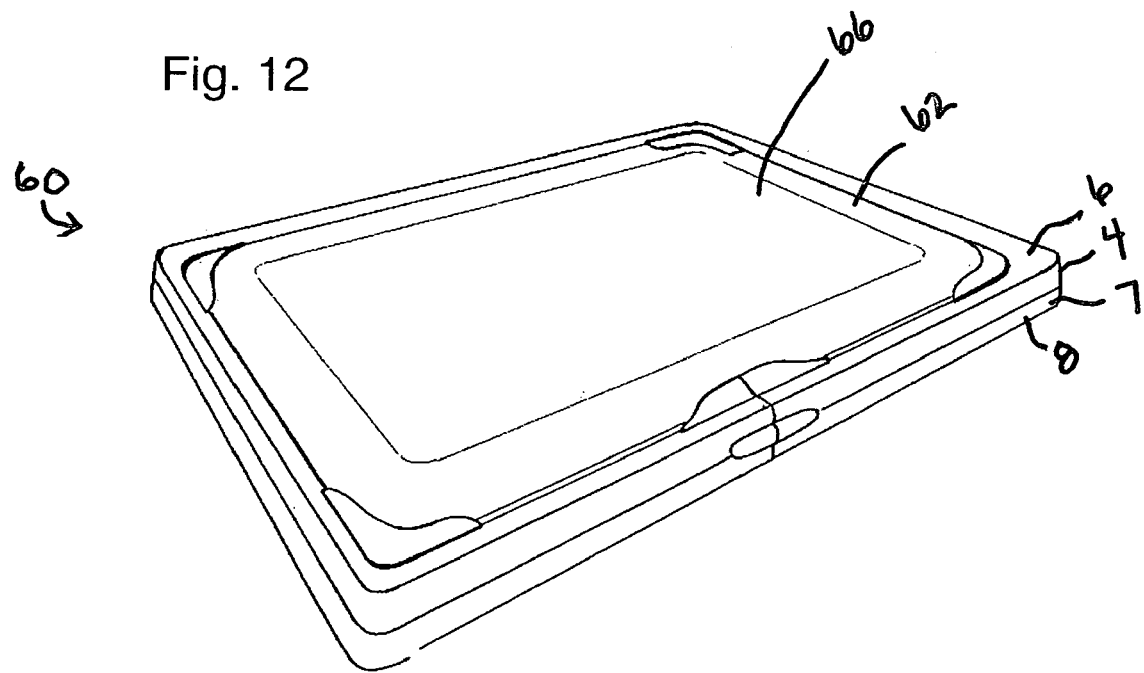
FIG. 12 is a perspective view of a seventh embodiment of the present invention.
Figure 13:
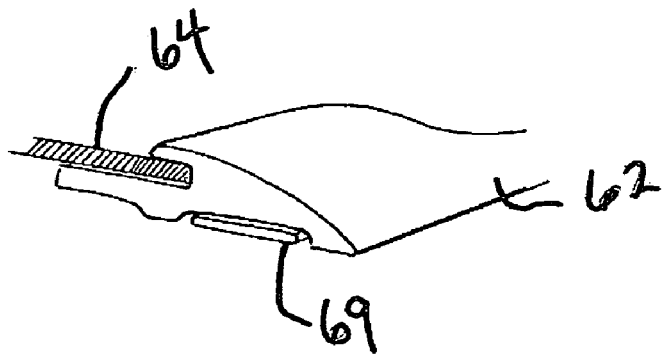
FIG. 13 is a partial perspective view of an attachment means used in conjunction with the present invention.
Figure 14:
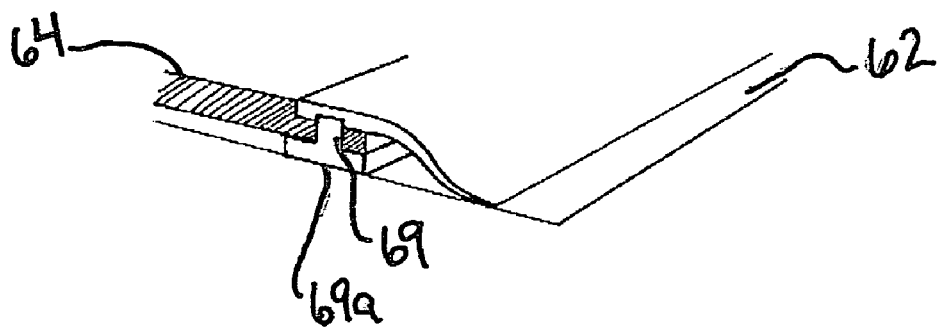
FIG. 14 is a partial perspective view of an attachment means used in conjunction with the present invention.
Figure 14A:
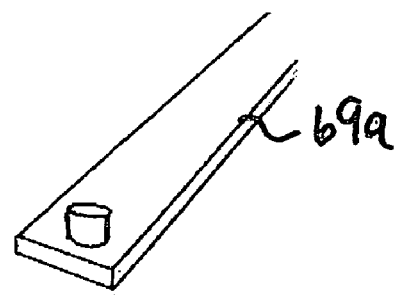
FIG. 14A is a male part for use with the attachment means of FIG. 14.
Figure 14B:
FIG. 14B is a male part for use with the attachment means of FIG. 14.
Figure 15:
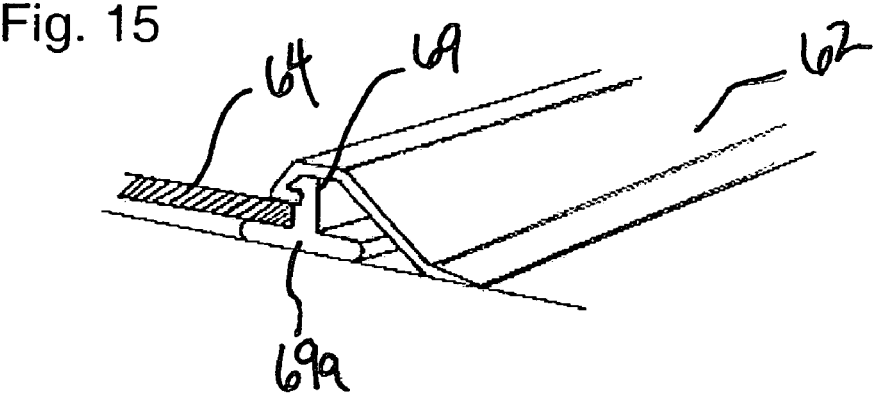
FIG. 15 is a partial perspective view of an attachment means used in conjunction with the present invention.
Figure 16:
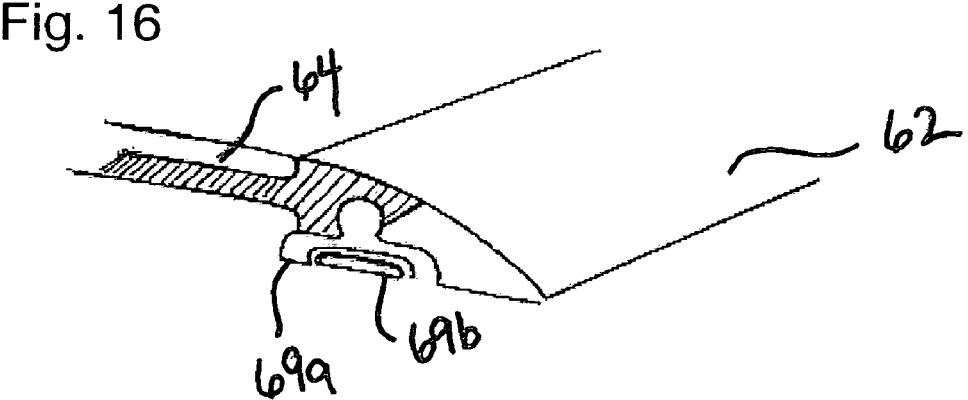
FIG. 16 is a partial perspective view of an attachment means used in conjunction with the present invention.
Figure 16A:
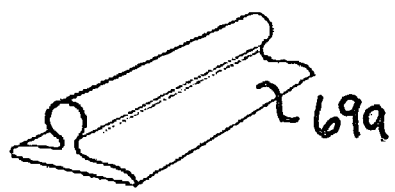
FIG. 16A is a male part for use with the attachment means of FIG. 16.
Figure 16B:
FIG. 16B is a male part for use with the attachment means of FIG. 16.
Figure 17:
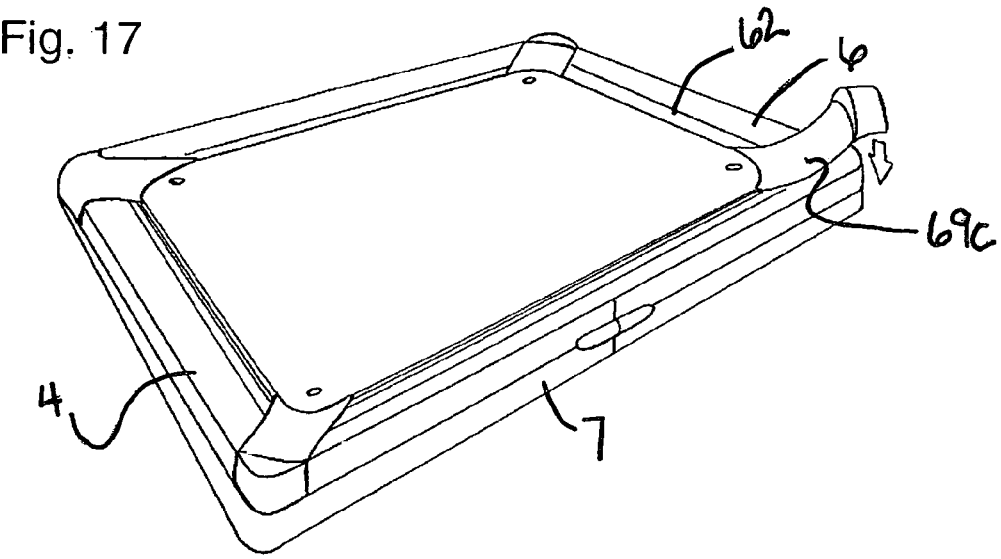
FIG. 17 is a partial perspective view of an attachment means used in conjunction with the present invention.
Figure 18:
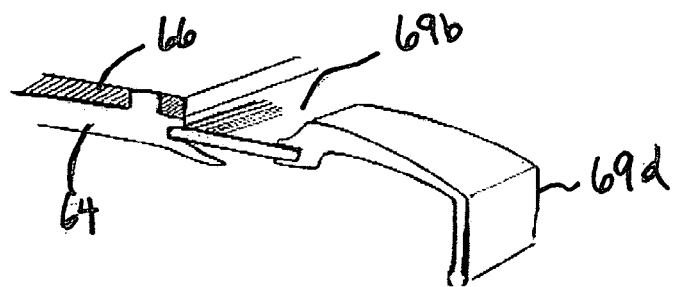
FIG. 18 is a partial perspective view of the attachment means of FIG. 17.

Referring to FIG. 12, the frame 62 of this enhancement 60 and the enhancements that follow can be adhered to the laptop 2 via any of the attachment means previously described or described below. Referring to FIGS. 13-18, several alternative attachment means 69 solutions are illustrated. For instance, FIG. 13 illustrates an adhesive attachment means 69 (there are numerous commercially available adhesives, including tapes, which satisfy this requirement and could be used as the adhesive; the exact characteristics of the adhesive would be known to one skilled in the art of adhesive substances); FIGS. 14, 14A, and 14B illustrate an attachment means 69 including a sub-frame arrangement including male/female connectors 69a wherein one of the female or male sub-frame connectors 69a or fittings is adhered to the laptop with an adhesive; FIG. 15 is an illustration of an attachment means 69 having a sub-frame provided with a keeper connector for frictionally engaging a portion of the frame 62; FIGS. 16, 16A, 16B are illustrations of alternative male/female sub-frame connectors 69a generally adhered to the outer surface of the laptop's cover panel with an adhesive 69b; FIGS. 17 and 18 are illustrations of an attachment means 69 provided with an elastic band 69c having keepers 69d for engaging the peripheral edges, preferably corners, of the laptop's cover panel 4. These are just a few of the many options available for securing the frame 62 of this or any other embodiment to the laptop 2.

Figure 19:
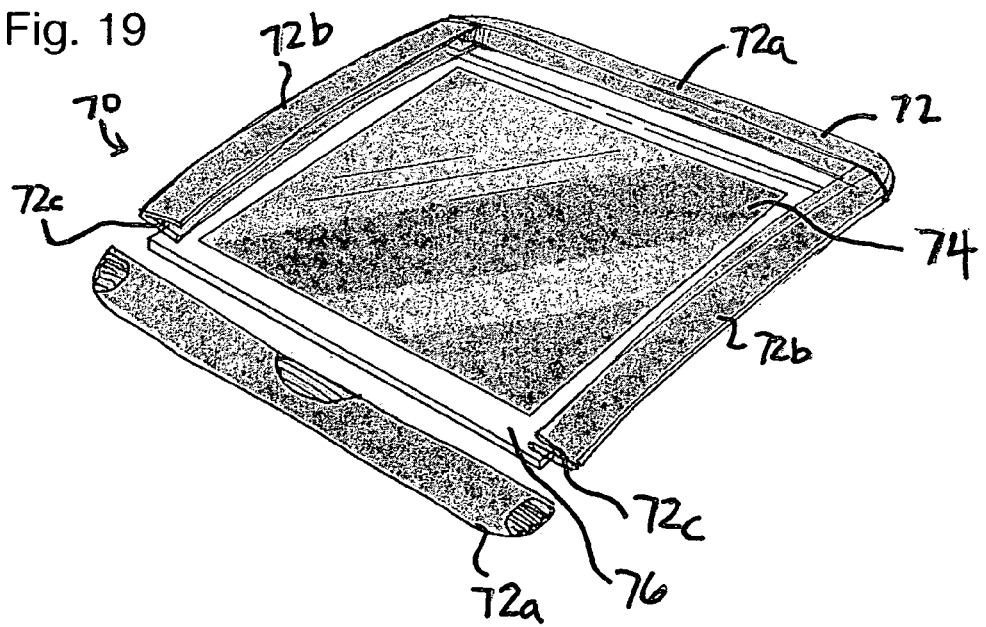
FIG. 19 is an exploded perspective view of the eighth embodiment of the present invention.

FIG. 19 shows a seventh embodiment of an enhancement 70 of the present invention. The enhancement 70 includes a first layer in the form of a frame 72, a second or media layer 74, and a translucent, preferably clear, third layer or cover 76. The second layer 74 fits within the frame 72. The third layer 76 may be flexible or rigid and overlays the second layer 74 to hold the second layer 74 in place.

The frame 72 includes opposing end caps 72a spaced apart by opposing transverse rails 72b. The frame members 72a, 72b include slots 72c for receiving edge portions of the third layer 76. The slots 72c include a ledge for supporting the third layer 76. At least one of the end caps 72a is detachable from opposing transverse rails 72b to allow the third layer 76 to be received within the slots 72c. Once the third layer 76 is fit within the slots 72c, the detachable end cap 72a is snug fit against ends of opposing transverse members 72b.

The frame members 72a, 72b can be produced from any suitable material. It is preferable for the transverse rails 72b to be produced from a metal and for the end caps 72a to be produced from natural or synthetic rubber or a polymeric material.

Figure 20:
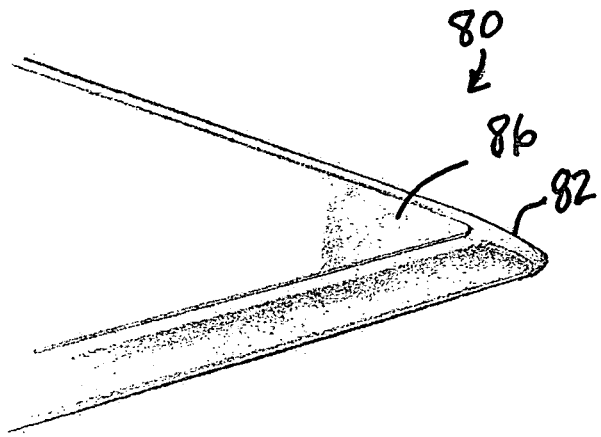
FIG. 20 is a partial perspective view of an eighth embodiment of the present invention.
Figure 21:
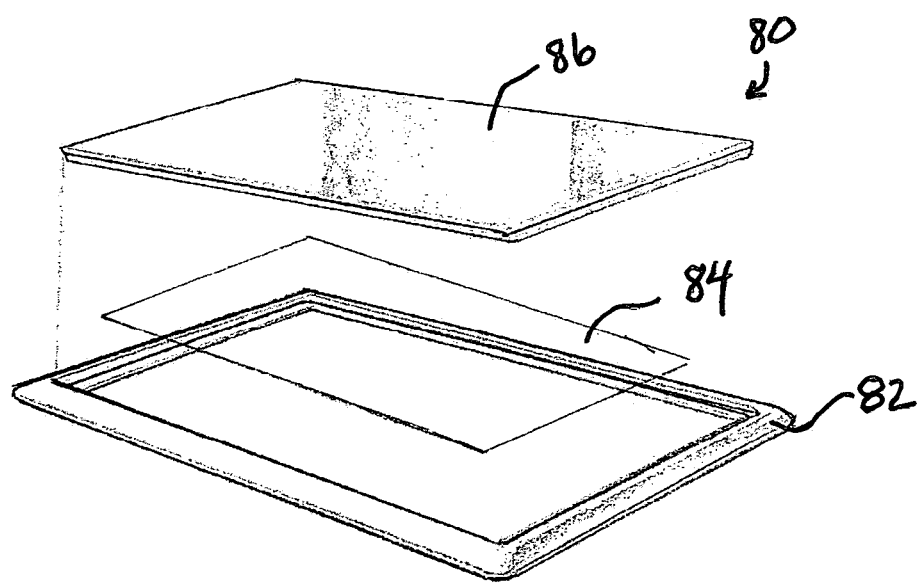
FIG. 21 is an exploded perspective view of the eighth embodiment of the present invention.
Figure 22:
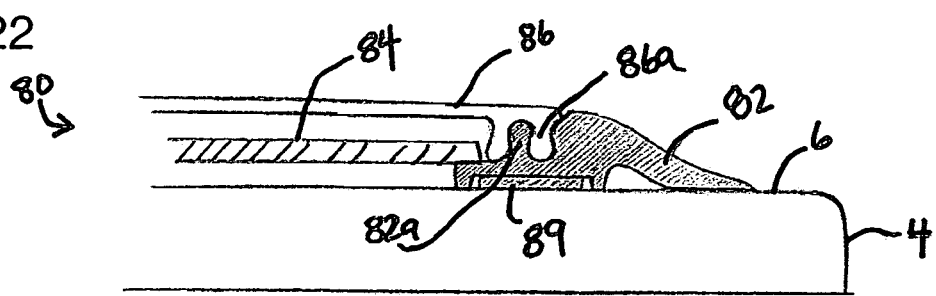
FIG. 22 is a partial cross sectional view of the eighth embodiment of the present invention.

Referring to FIGS. 20-22, an eighth embodiment of an enhancement 80 is illustrated. The enhancement 80 includes a first layer in the form of a unitary frame 82, a second or media layer 84, including some form of expression, overlaying a portion of the frame 82, and a third translucent, preferably clear, layer 86 overlaying at least a portion of the second layer 84. The frame 82 is attached to the outer surface 6 of the cover panel 4 using any suitable attachment means, preferably an adhesive 89.

The frame 82 and the third layer 86 are removably attached to each other. The frame 82 includes male member 82a. Male member 82a is preferably circumferential about a radial inner portion of the frame 82. The third layer 86 includes a female portion 86a. The female portion 86a cooperatively interlocks with the male portion 82a via press fit to retain the third layer 86 to the frame 82. Accordingly, the female portion 86a is preferably circumferential about a radial outer portion of the third layer 86.

Figure 23:
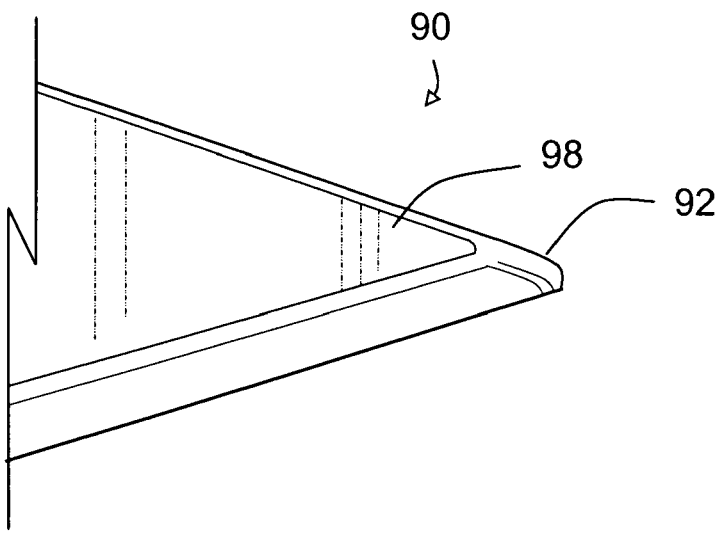
FIG. 23 is a partial perspective view of a ninth embodiment of the present invention.
Figure 24:
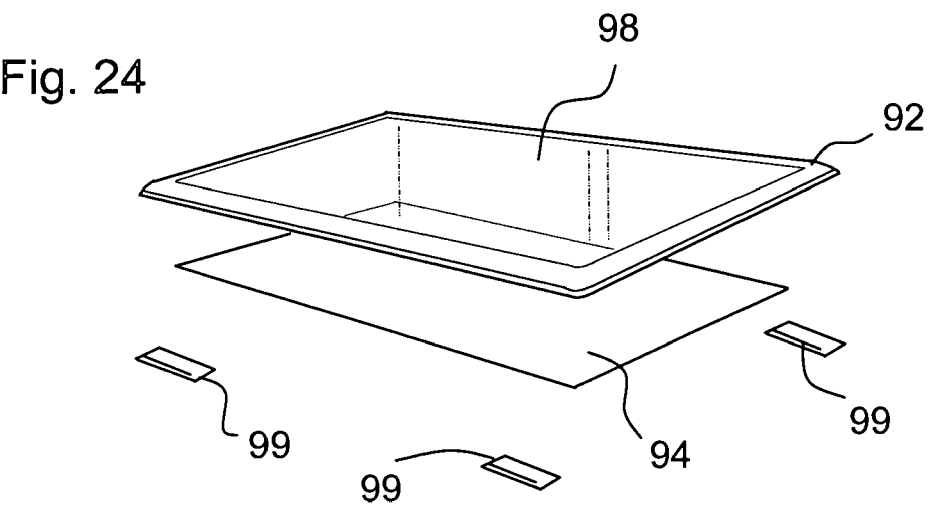
FIG. 24 is an exploded perspective view of the ninth embodiment of the present invention.
Figure 25:
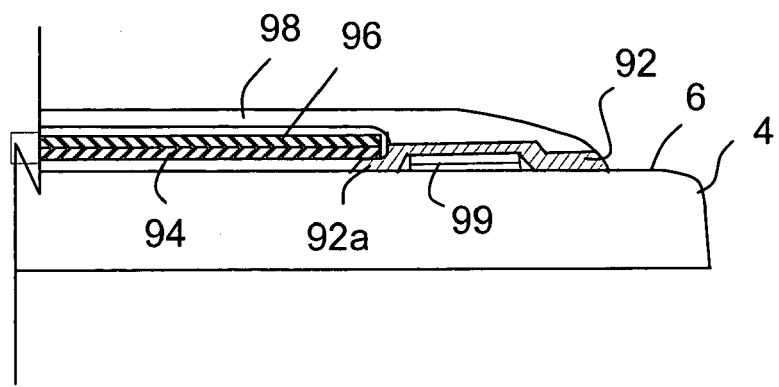
FIG. 25 is a partial cross sectional view of the ninth embodiment of the present invention.

Referring to FIGS. 23-25, a ninth embodiment of an enhancement 90 of the present invention is illustrated. The enhancement 90 includes a first layer in the form of a unitary frame 92, a second layer 94, a media or third layer 96 including an expression of an idea, and a translucent, preferably clear, fourth layer or cover 98. The frame 92 is removably attached to the outer surface 6 of the cover panel 4 via attachment means, preferably an interlocking pad 99, such as those manufactured by the 3M Company.

The frame 92 includes a radially inwardly extending ledge 92a upon which the second layer 94 is supported. Accordingly, the second layer 94 overlays at least the ledge 92a of the frame 92. The third layer 96 overlays at least a portion of the second layer 94 and is supported atop the second layer 94. The second layer 94 maintains a flat or planar appearance of the third layer 96. The fourth layer 98 overlays the third layer 96 and is preferably a unitary construction with the frame or even integrally formed with the frame 92 wherein the media or third layer 94 is attached and/or inserted from underneath the frame 92.

Figure 26:
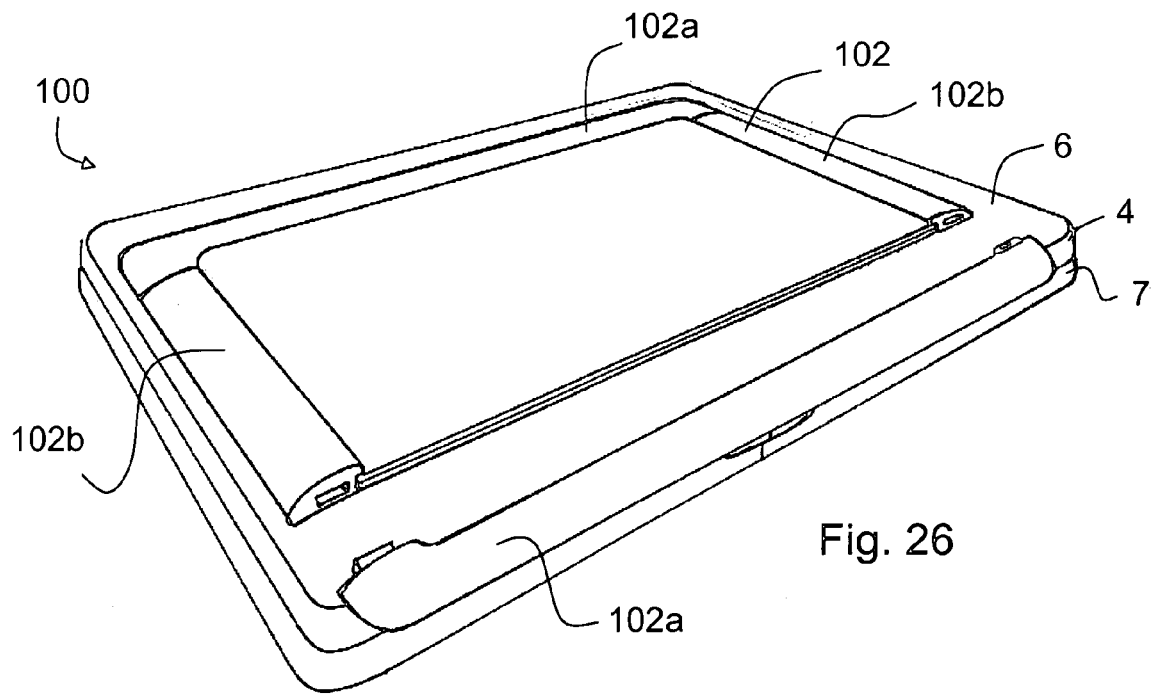
FIG. 26 is a exploded perspective view of a tenth embodiment of the present invention.
Figure 27:
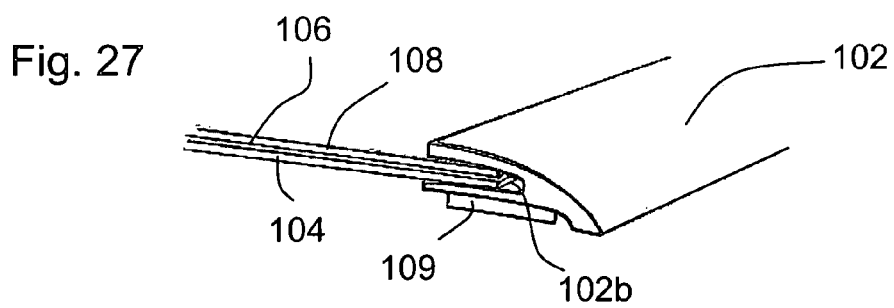
FIG. 27 is a partial exploded perspective view of the tenth embodiment of the present invention.
Figure 28:
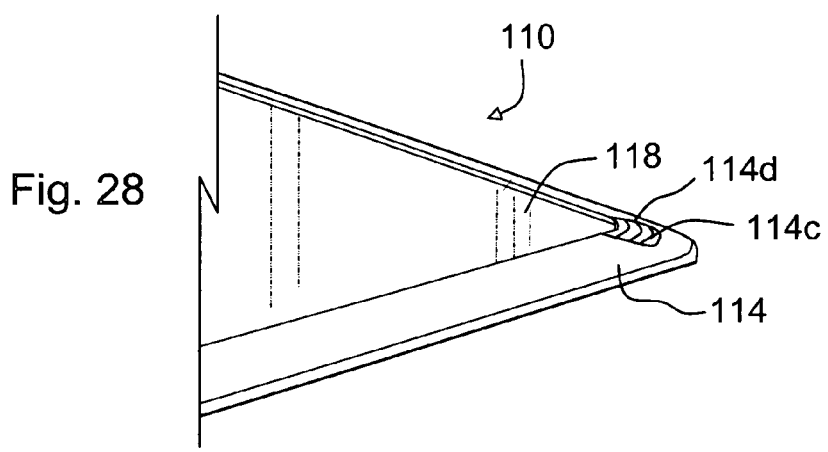
FIG. 28 is a partial cross sectional view of the eleventh embodiment of the present invention.
Figure 29:
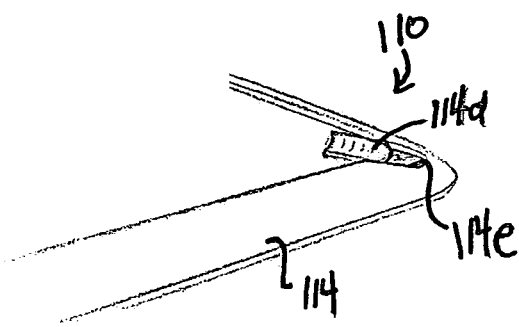
FIG. 29 is a partial perspective view of an eleventh embodiment of the present invention.
Figure 30:
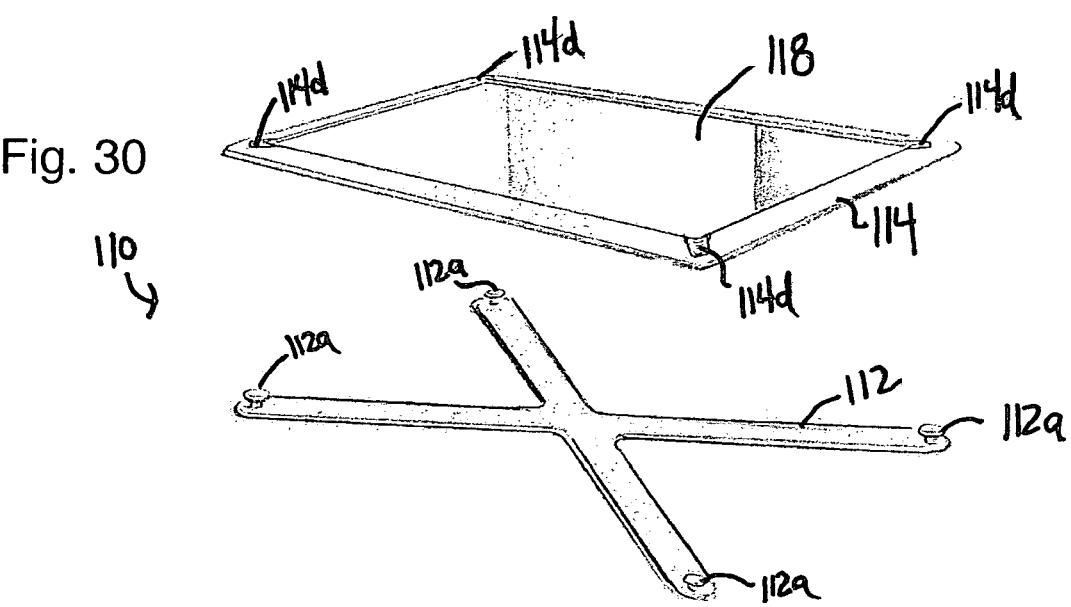
FIG. 30 is an exploded perspective view of the eleventh embodiment of the present invention.
Figure 31:
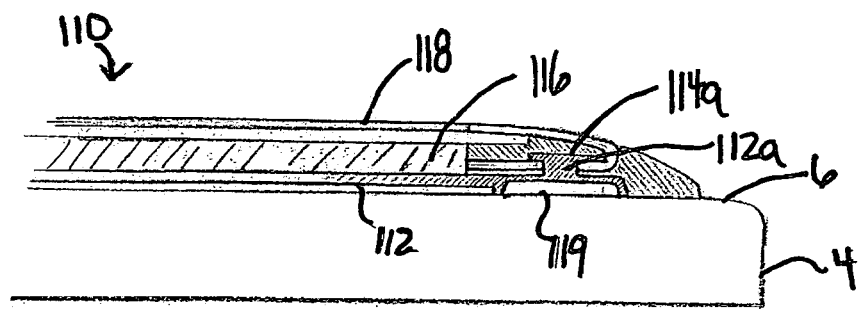
FIG. 31 is a partial cross sectional view of the eleventh embodiment of the present invention.

Referring to FIGS. 26-27, a tenth embodiment of an enhancement 100 of the present invention is illustrated. This enhancement 100 is similar to the seventh embodiment. The enhancement 100 includes a first layer in the form of a frame 102, a second layer 104, a media or third layer 106, and a translucent, preferably clear, fourth layer or cover 108. The second, third, and fourth layers 104, 106, 108 fit within the frame 102. The third layer 106 is sandwiched between the second and fourth layers 104, 108 to hold the third layer 74 in place. The frame 102 is attached to the outer surface 6 by an attachment means 109.

The frame 102 of this enhancement 100 is similarly structured to the frame 72 of the seventh embodiment. Accordingly, the frame 102 includes opposing end caps 102a spaced apart by opposing transverse rails 102b. The frame members 102a, 102b include slots 102c for receiving edge portions of at least the second and fourth layers 104, 108, but preferably edge portions of the media layer 106 as well. The slots 102c include ledges for supporting the other layers. At least one of the end caps 102a is detachable from opposing transverse rails 102b to allow the second, third and fourth layers 104, 106, 108 to be received within the slots 102c. Once the layers 104, 106, 108 are fit within the slots 102c, the detachable frame member 102a is snug fit against ends of opposing frame members 102b.

Referring to FIGS. 28-31, an eleventh embodiment of an enhancement 110 of the present invention is illustrated. The enhancement 110 includes a first layer 112, a second layer 114, a media or third layer 116, and a fourth layer 118.

The first layer 112 is preferably a unitary sub-frame adhered to the outer surface 6 of the cover panel 4. An adhesive or other means 119 is provided to attach the sub-frame. The sub-frame 112 has an X-shaped structure with legs that radiate outwardly from a center portion towards corners of the laptop's cover panel 4. At terminal ends of the legs, the sub-frame 112 includes connectors 112a for joining the second layer 114 to the sub-frame 112. The connectors 112a are preferably T-shaped (in cross-section) brackets extending upwardly/outwardly from the sub-frame 112.

The second layer 114 is in the form of a unitary frame. This unitary frame 114 includes receivers 114a adapted, as in at least appropriately sized and produced from an appropriate material, to receive the connectors 112a for secure attachment of the frame 114 to the sub-frame 112. The frame 114 also includes slots 114b for receiving and supporting the third layer 116.

The fourth layer 118 is translucent, preferably clear, and overlays the frame 114, and can be assembled to become a single part with the frame 114. Accordingly, the fourth layer 118 is locked into place by locking mechanisms 114c located at corners of the frame 114. The locking mechanisms 114c include a locking mechanism in the form of buttons 114d that traverse within channels 114e. When the buttons 114d are selectively retracted (FIG. 28) radially outwardly, the fourth layer 118 can be removed from the frame 114, and the third (media) layer 116 can be replaced as necessary or desired. When the buttons 114d are selectively extended radially inwardly (FIG. 29), a portion of each button 114d overlays the fourth layer 118 to lock the fourth layer 78 in place overlaying the third layer 116.

Figure 32:
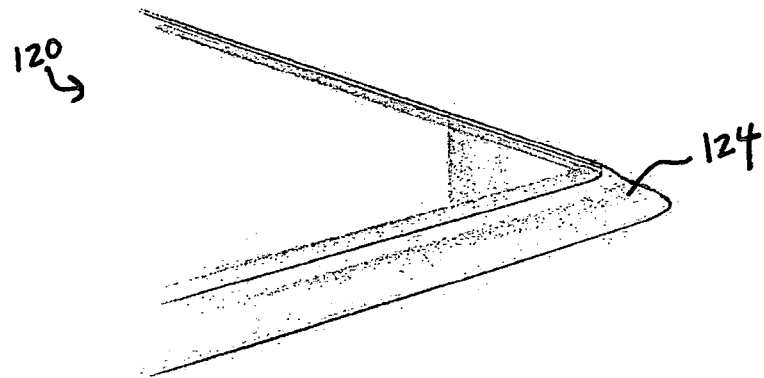
FIG. 32 is a partial perspective view of an twelfth embodiment of the present invention.
Figure 33:
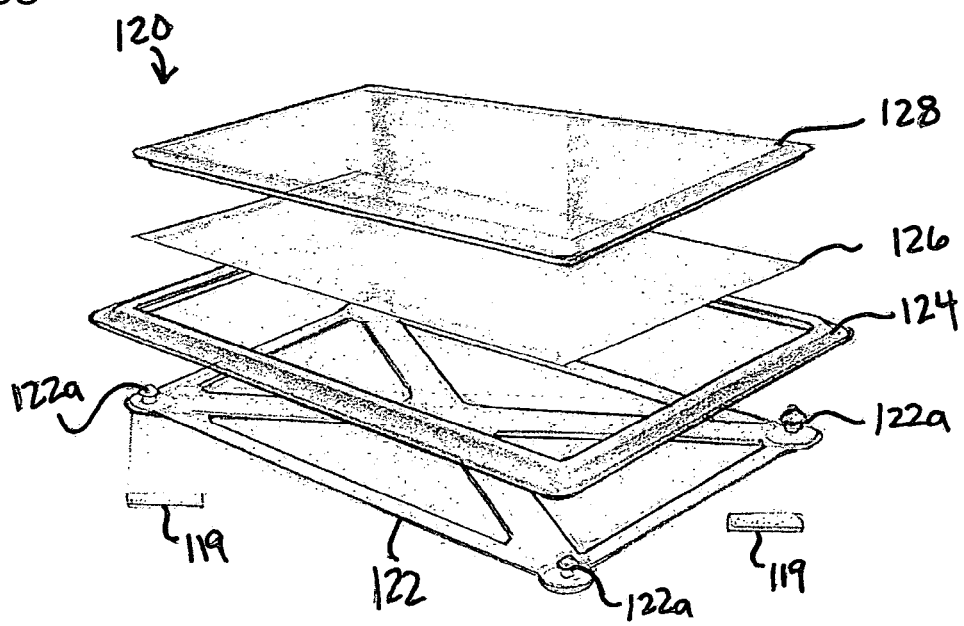
FIG. 33 is an exploded perspective view of the twelfth embodiment of the present invention.
Figure 34:
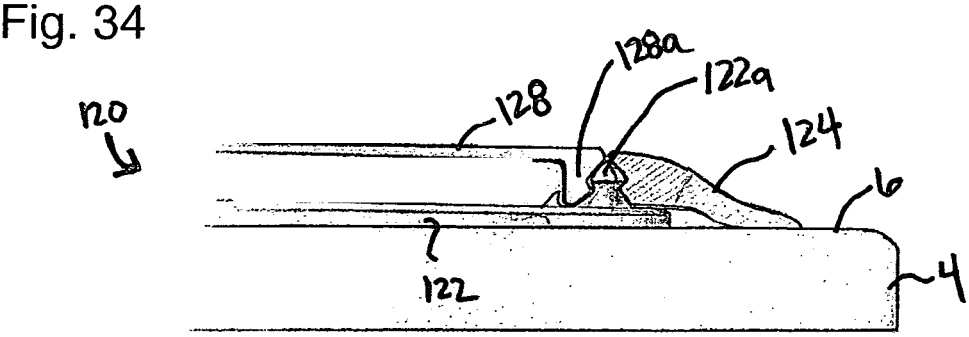
FIG. 34 is a partial cross sectional view of the twelfth embodiment of the present invention.

Referring to FIGS. 32-34, a twelfth embodiment of an enhancement 120 of the present invention is illustrated. The enhancement 120 includes a first layer 122, a second layer 124, a third layer 126, and a fourth layer 128, each successive layer overlaying at least a portion of the previous layer.

The first layer 122 is preferably a unitary sub-frame adhered to the outer surface 6 of the cover panel 4. An adhesive or other means 119 can be provided to attach the sub-frame 122. The sub-frame 122 includes a circumferential perimeter edge portion surrounding an X-shaped structure having legs that radiate outwardly from a center portion towards corners of the circumferential perimeter edge portion. At terminal ends of the legs, the sub-frame 122 includes connectors 122a for joining the second layer 124 to the sub-frame 122. The connectors 122a preferably include keepers 122b extending upwardly/outwardly from the sub-frame 122.

The second layer 124 is in the form of a unitary frame. This unitary frame 124 includes receivers 124a adapted, as in at least appropriately sized and produced from an appropriate material, to receive the connectors 122a for secure attachment of the frame 124 to the sub-frame 122.

The third or media layer 126 includes some expression of an idea and overlays at least a portion of the frame 124 and the sub-frame 122.

The fourth layer or cover 128 is translucent, preferably clear, and is attachable to the sub-frame 122. Accordingly, the fourth layer 128 includes receivers 128a for cooperation with the connectors 122a. The fourth layer 128 can be removed to access and replace the third layer 126 when necessary.

Figure 35:
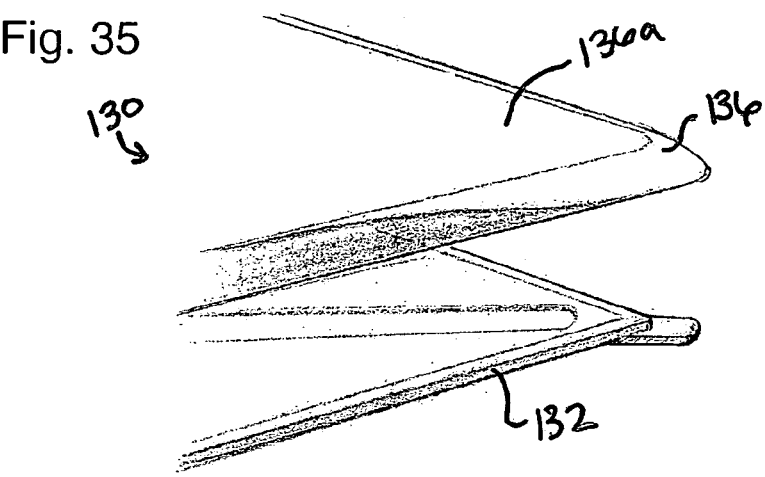
FIG. 35 is a partial exploded perspective view of an thirteenth embodiment of the present invention.
Figure 36:
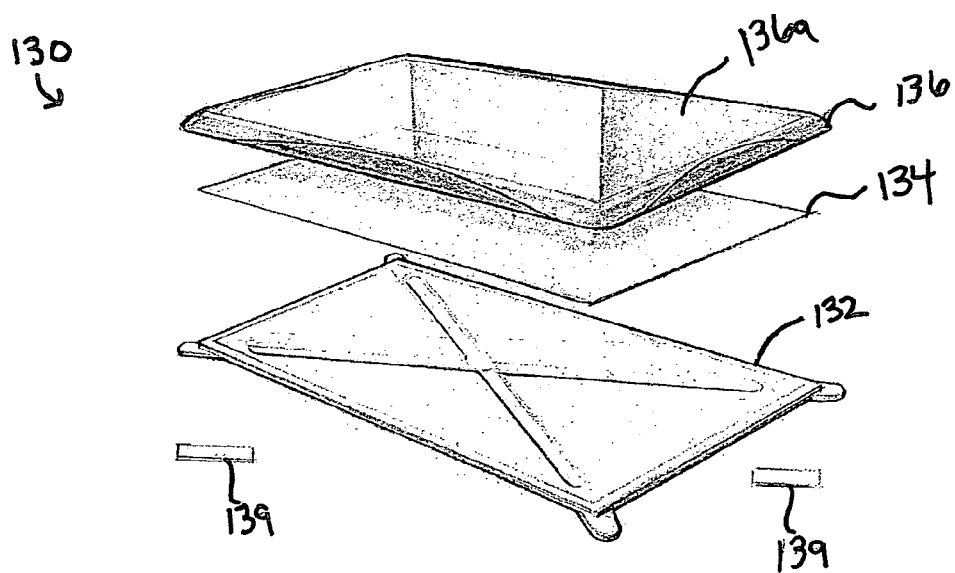
FIG. 36 is an exploded perspective view of the thirteenth embodiment of the present invention.
Figure 37:
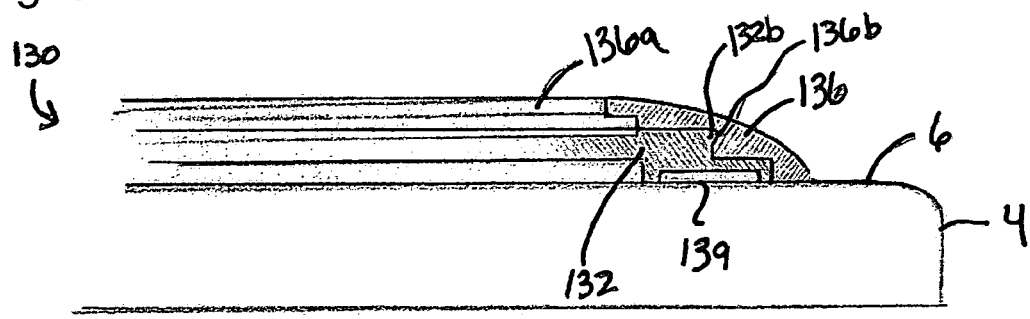
FIG. 37 is a partial cross sectional view of the thirteenth embodiment of the present invention.

Referring to FIGS. 35-37, a thirteenth embodiment of an enhancement 130 of the present invention is illustrated. The enhancement 130 is similar to the ninth embodiment. This enhancement 130 includes a first layer in the form of a sub-frame 132, a second/media layer 134, and a third layer 136 in the form of a unitary frame, including an integral translucent, preferably clear, cover 136a.

The sub-frame 132 is removably attached to the outer surface 6 of the cover panel 4, preferably by adhesive strips 139.

The frame 136 mates with snap fit to the perimeter edge of the sub-frame 132 to enclose the second layer 134 between the sub-frame 132 and the cover 136a. To accommodate the snap fit, the sub-frame 132 preferably includes a circumferential lip 132a about the perimeter edge of the sub-frame 132. The frame 136 includes a corresponding channel 136b adapted to receive the lip 132b. (See FIG. 37).

Figure 38:
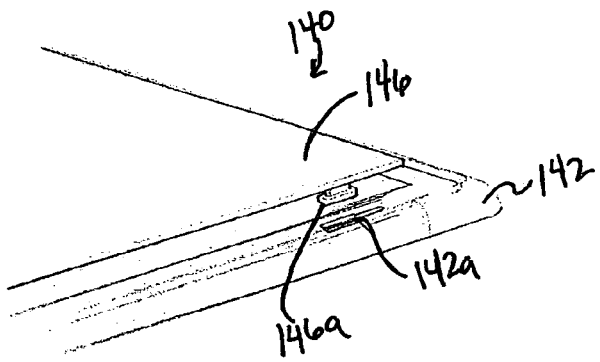
FIG. 38 is a partial exploded perspective view of a fourteenth embodiment of the present invention.
Figure 39:
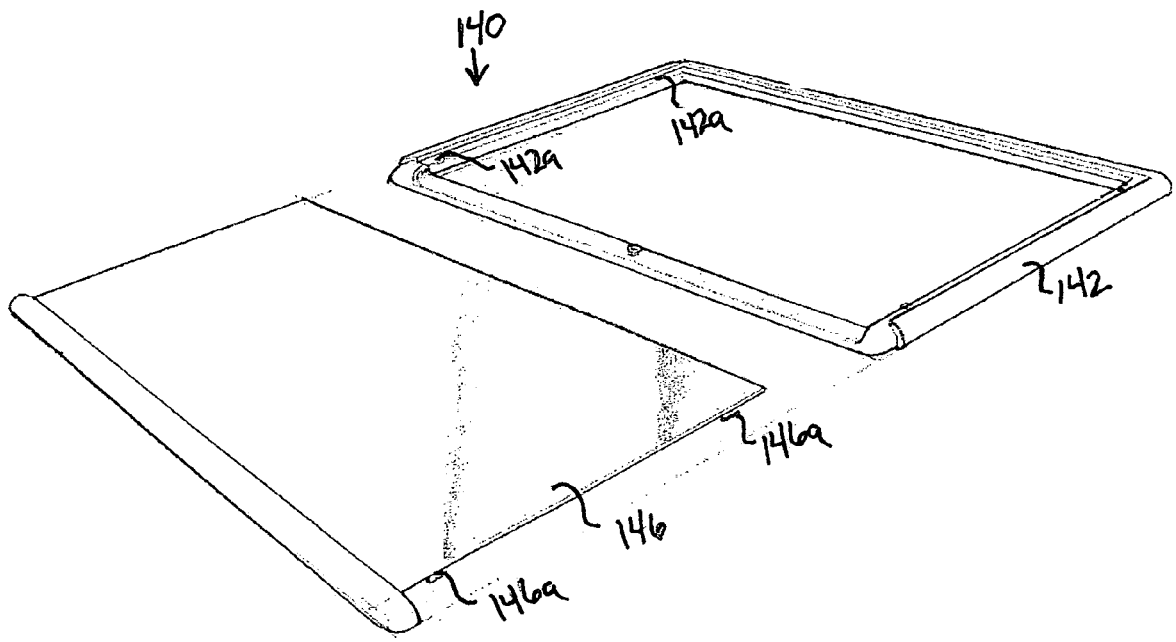
FIG. 39 is an exploded perspective view of the fourteenth embodiment of the present invention.
Figure 40:
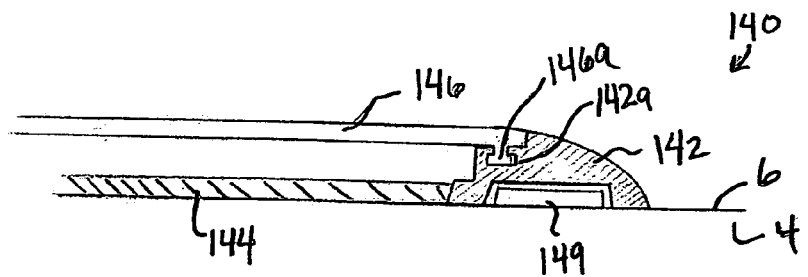
FIG. 40 is a partial cross sectional view of the fourteenth embodiment of the present invention.
Figure 41:
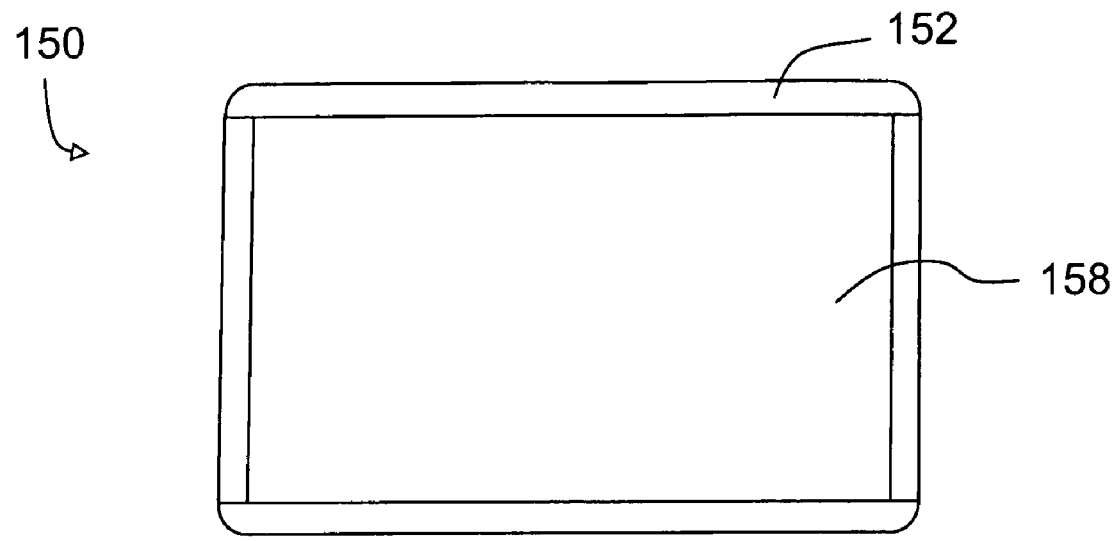
FIG. 41 is a top view of a fifteenth embodiment of the present invention.
Figure 42:
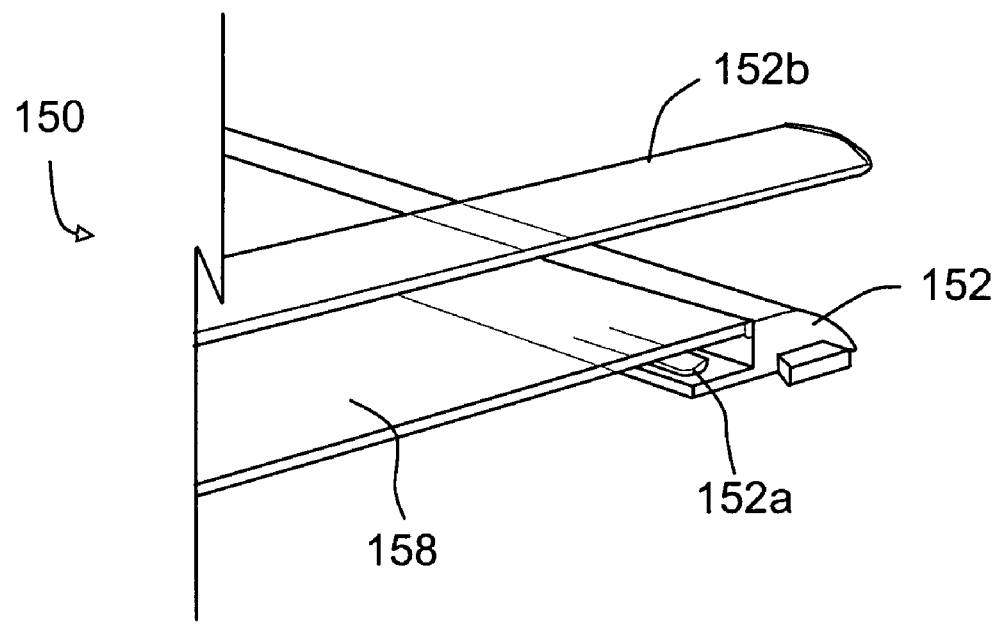
FIG. 42 is a partial exploded perspective view of the fifteenth embodiment of the present invention.
Figure 43:
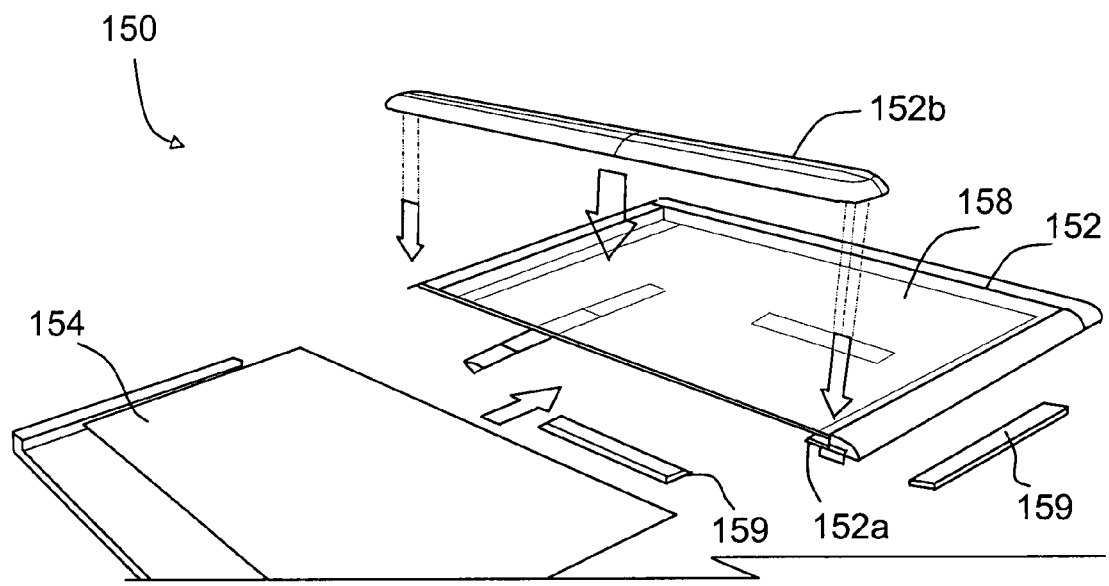
FIG. 43 is an exploded perspective view of the fifteenth embodiment of the present invention.
Figure 44:
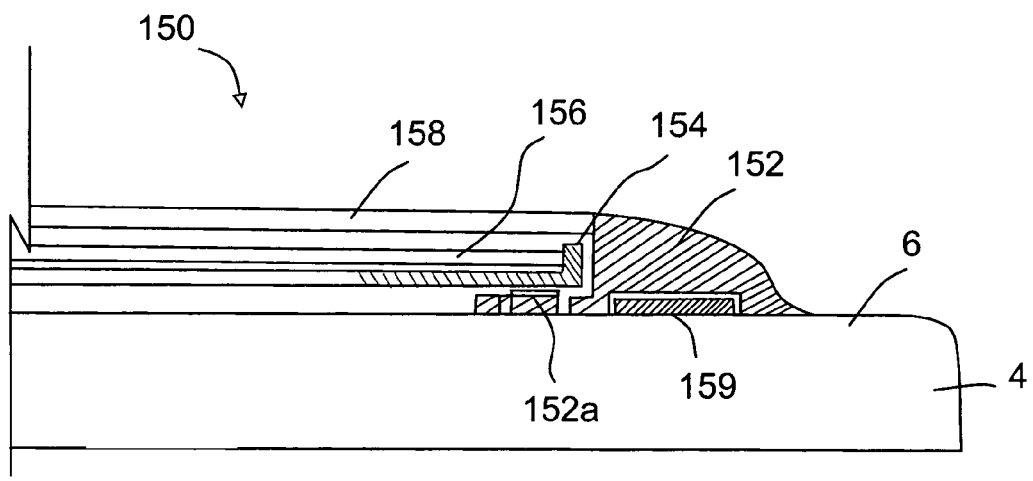
FIG. 44 is a partial cross sectional view of the fifteenth embodiment of the present invention.

Referring to FIGS. 38-40, a fourteenth embodiment of an enhancement 140 of the present invention is illustrated. This enhancement 140 includes a first layer 142 in the form of a frame, a second/media layer 144, and a third translucent, preferably clear, layer/cover 146. The frame 142 is removably adhered to the outer surface 6 of the laptop's cover panel 4 via attachment means 149.

The frame 142 includes connectors in the form keyholes 142a, any openings, holes, or inwardly extending chamber or discontinuity with or without keepers or teeth, for cooperative mating with connectors in the form of keys 146a, any extension or outwardly extending discontinuity or member with or without keepers or teeth, located along the peripheral edge of the third layer 146. The combination of the keys 146a within the keyholes 142a with frictional engagement retains the third layer 146 to the frame 142.

Referring to FIGS. 41-44, a fifteenth embodiment of an enhancement 150 of the present invention is illustrated. The enhancement 150 includes a first layer 152, a second layer 154, a third/media layer 156, and a fourth layer/cover 158. The first layer 152 is removably attached to the outer surface 6 of a laptop by attachment means 159, preferably an interlocking pad.

The first layer 152 is in the form of a frame. The frame 152 includes a radially inwardly extending lip 152a and at least one removable end cap 152b. The end cap 152b is attachable to the remaining portion of the frame 152 to secure the third layer 156 within the frame 152.

The second layer 154 is in the form of a tray with drawer-like features. The tray 154 slides into the frame along the tops of the lip 152a. The third layer 156 rests atop the tray 154. The tray 154 is retained within the frame 152 by the end cap 152b.

The fourth layer 158 is a translucent, preferably clear, cover. The cover 158 is preferably integrally joined to the frame 152 such that the frame 152 and the cover 158 are of a unibody construction.

Figure 45:
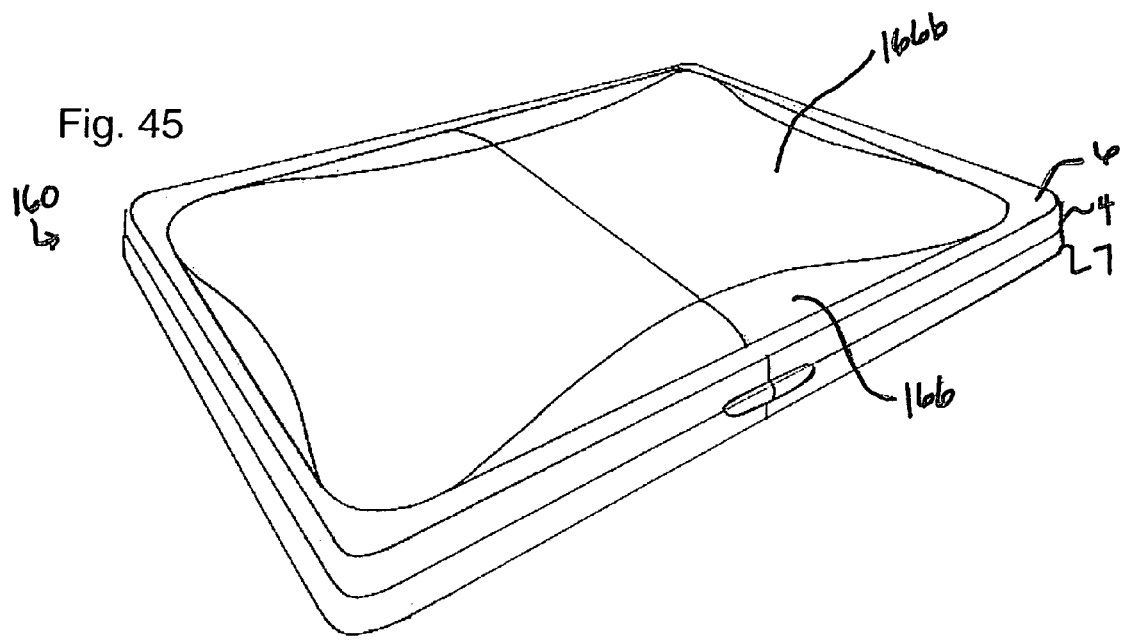
FIG. 45 is a perspective view of a sixteenth embodiment of the present invention.
Figure 46:
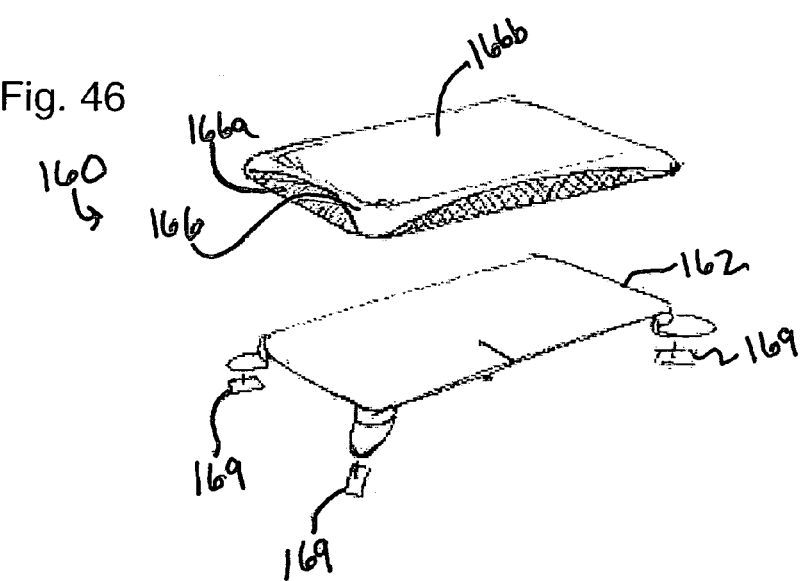
FIG. 46 is an exploded perspective view of the sixteenth embodiment of the present invention.
Figure 47:
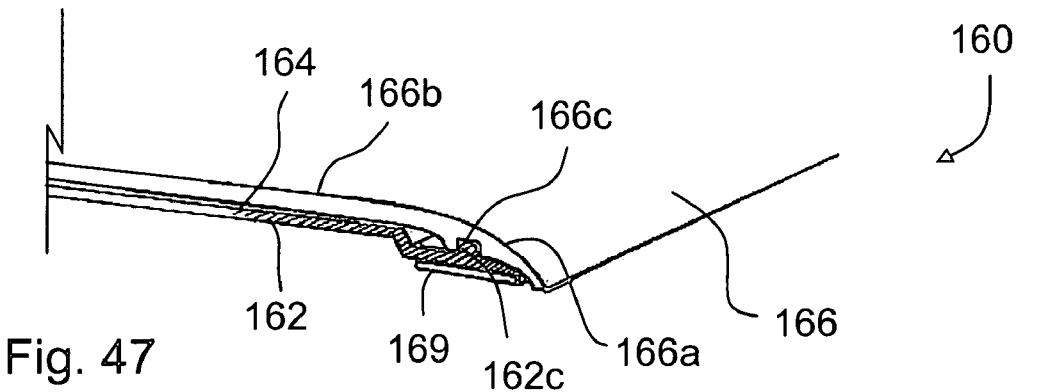
FIG. 47 is a partial cross sectional view of the sixteenth embodiment of the present invention.

Referring to FIGS. 45-47, a sixteenth embodiment of an enhancement 160 of the present invention is illustrated. The enhancement 160 includes a first layer 162, a second/media layer 164, and a third layer 166.

The first layer 162 is adhered to the outer surface 6 of the cover panel 4 by attachment means 169. The first layer 162 includes a body of a thin sheet construction, preferably a stamped metal sheet. The thin sheet construction is suitable for supporting the media layer 164 thereon.

The third layer 166 includes a soft polymeric, natural or synthetic rubber perimeter 166a. The center portion, radially inward from the perimeter, is a translucent, preferably clear, cover section 166b. The third layer 166 is removably secured to the first layer 162. Preferably, the perimeter 166a includes receivers 166c adapted for receiving male members 162c located along a periphery of the first layer 162. The attachment of the first layer 162 to the third layer 166 secures the media layer 164 therebetween.

Figure 48:
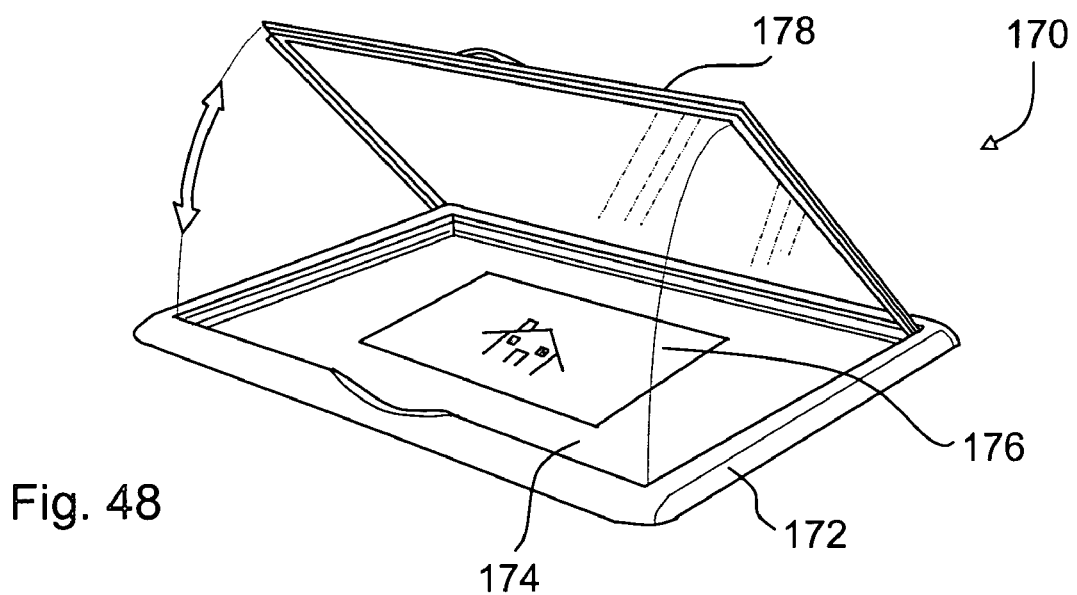
FIG. 48 is a perspective view of a seventeenth embodiment of the present invention.
Figure 49:
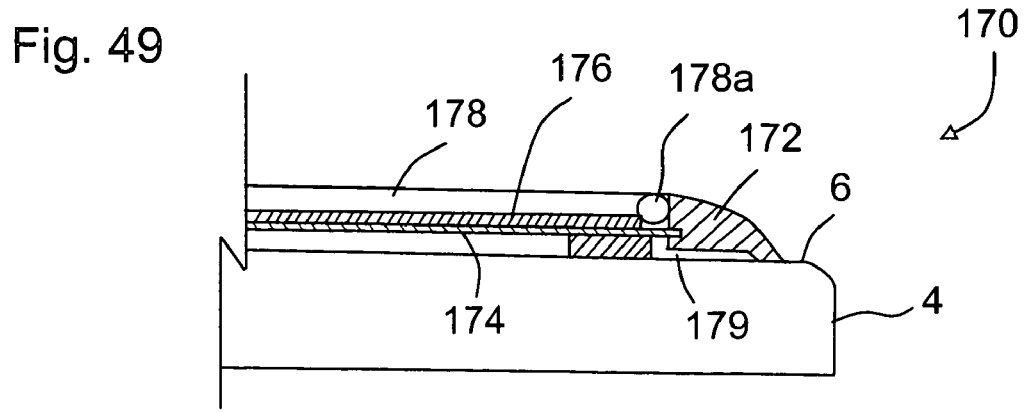
FIG. 49 is a partial cross sectional view of the seventeenth embodiment of the present invention.
Figure 50:
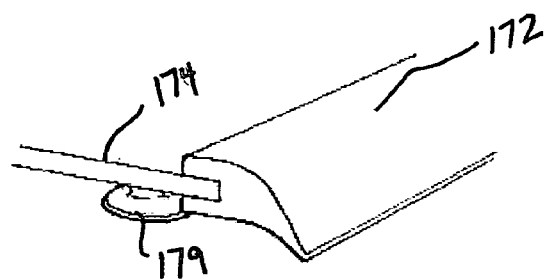
FIG. 50 is a partial perspective view of an alternate means of attaching the enhancement of the present invention.

Referring to FIGS. 48-50, a seventeenth embodiment of an enhancement 170 of the present invention is illustrated. The enhancement 170 includes a first layer 172, a second layer 174, a third/media layer 176, and a fourth layer/cover 178.

The first layer 172 is in the form of a frame, preferably of a flexible polymer or natural or synthetic rubber. The frame 172 is removably attached to the outer surface 6 of the laptop's cover panel 4. An attachment means 179, preferably a foam tape, is provided to removably secure the frame 172 to the cover panel 6. Alternatively, the attachment means 179 can be a suction cup as illustrated in FIG. 50.

The second layer 174, preferably a flat sheet of sufficient rigidity to support the media layer 176, overlays a portion of the frame 172 and is secured thereto.

The fourth layer 178 is a translucent, preferably clear, cover. The cover 178 is hingedly joined to the frame 172 by a hinge 178a. This arrangement allows the cover 178 to be easily lifted and replaced to change the media layer 176 when necessary or desired.

Figure 51:
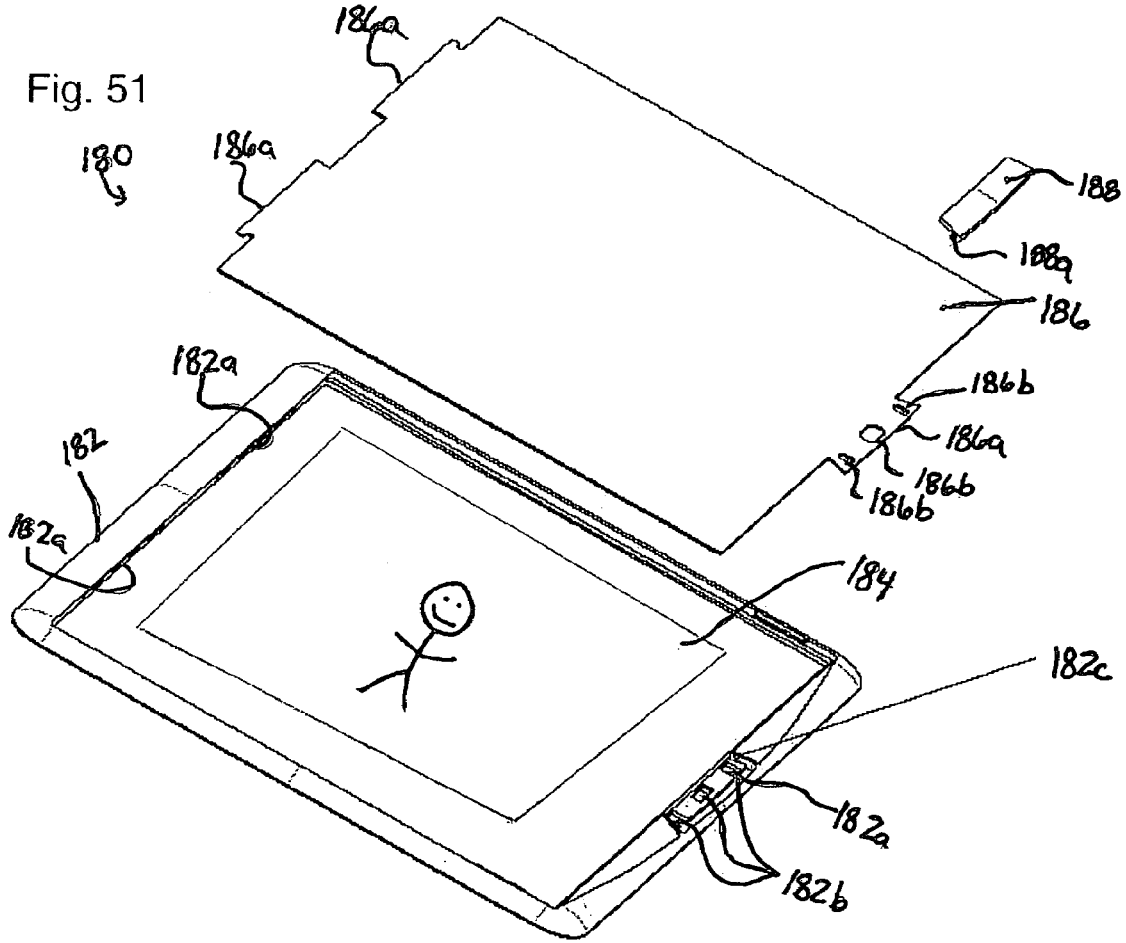
FIG. 51 is an exploded perspective view of an eighteenth embodiment of the present invention.

Referring to FIG. 51, an eighteenth embodiment of an enhancement 180 of the present invention is illustrated. The enhancement includes a first layer 182, a second/media layer 184, a third layer/cover 186, and a locking mechanism 188 for selectively securing the first and third layers 182, 186 together.

The first layer 182 is in the form of a frame having a flat sheet center portion, upon which the media layer 184 rests, surrounded by a raised peripheral border to retain the media layer 184 therebetween.

The third layer 186 is a translucent, preferably clear, cover. The cover 186 is securable to the frame 182 to securely retain the media layer 184 between the cover 186 and the frame 182. The cover includes connectors in the form of keys 186a that fit within and frictionally engage connectors in the form of keyholes 182a located along a radially inner portion of the raised peripheral border of the frame 182. At least one of the keys 186a includes apertures 186b. This particular key with the apertures 186b can be integral with the cover or a separate element attached to the cover 186. The apertures 186b are alignable with corresponding openings 182b located on a tongue 182c positioned within at least one of the keyholes 182a on the frame 182. The locking mechanism 188 selectively fits over the keyhole 182a to retain the cover 186 to the frame 182. In FIG. 51, the locking mechanism 188 is shown as a separate element. However, the locking mechanism can be integral with the cover or an element which attaches to the cover similar to the key 186a with keyholes 186b. The locking mechanism 188 has keepers extending outwardly (not shown) that fit within the aligned apertures 186b and openings 182b to frictionally engage the tongue 182b. The locking mechanism 188 further includes a lip 188a that also frictionally engages the tongue 186c. It should be understood that the cover 186 can be the image insert 184, and vice versa, with all of the accompanying and associated elements and attachments, as described for the cover 186. In such an embodiment, a cover 186 would be optional and provided more for preventing the image insert 184 from getting dirty, than to keep the image insert sustained within the frame 182.

Figure 52:
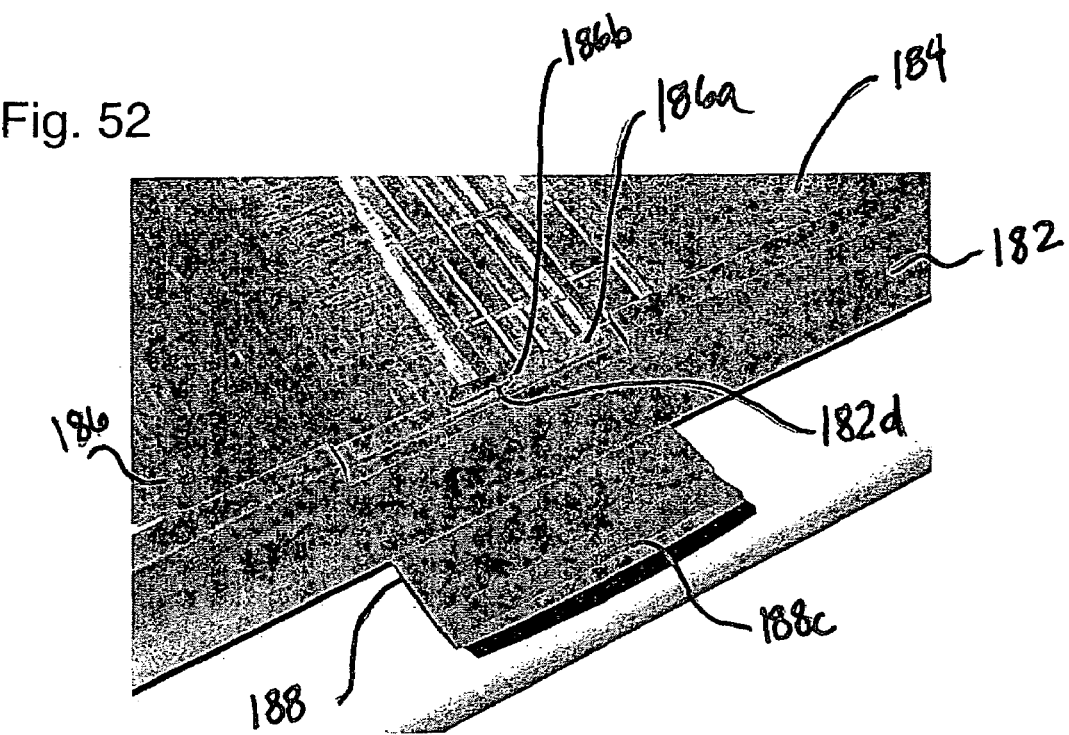
FIG. 52 is an alternative locking mechanism of the present invention.

FIG. 52 is an illustration of an alternative locking mechanism 188. This locking mechanism 188 is hingedly connected to either the frame 182 or the cover 186, but preferably the frame 182. The locking mechanism 188 includes a female portion 188c for frictionally receiving a male extension 182d. In this embodiment, an attachment portion 186a of the cover 186, has an aperture 186b which fits onto the male extension 182d to align the cover 186 on the frame 182. The frictional cooperation between the female portion 188c and the male extension 182d locks the cover 186 to the frame 182 with the media layer 184 therebetween. The cover 186 can also be the image insert, or the cover can fit over the image insert, as decribed.

Figure 53:
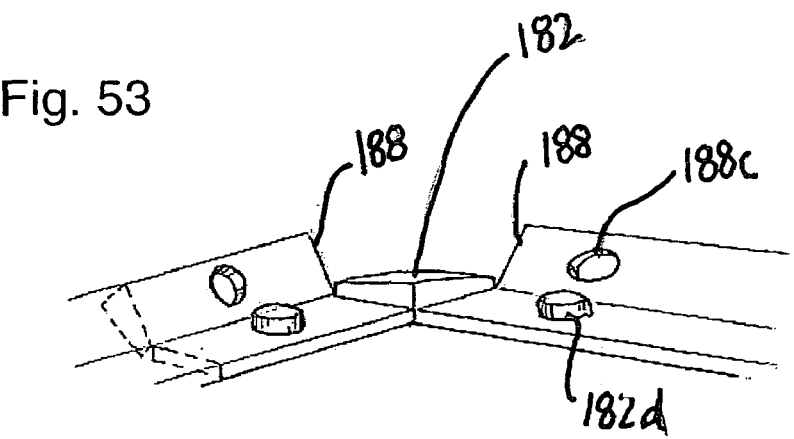
FIG. 53 is an alternative locking mechanism of the present invention.

Referring to FIG. 53 is an illustration of another alternative locking mechanism 188. This locking mechanism 188 is hingedly connected to the frame 182. The locking mechanism 188 includes a female portions or holes 188c for frictionally receiving a male extension 182d on the keyhole 182a located on the frame 182. An aperture 186b on the key 186a of the cover 186 fits over the male extension 182d to align the cover 186b on the frame 182. The frictional cooperation between the female portion 188c and the male extension 182d locks the cover 186 to the frame 182 with the media layer 184 therebetween.

Figure 54:
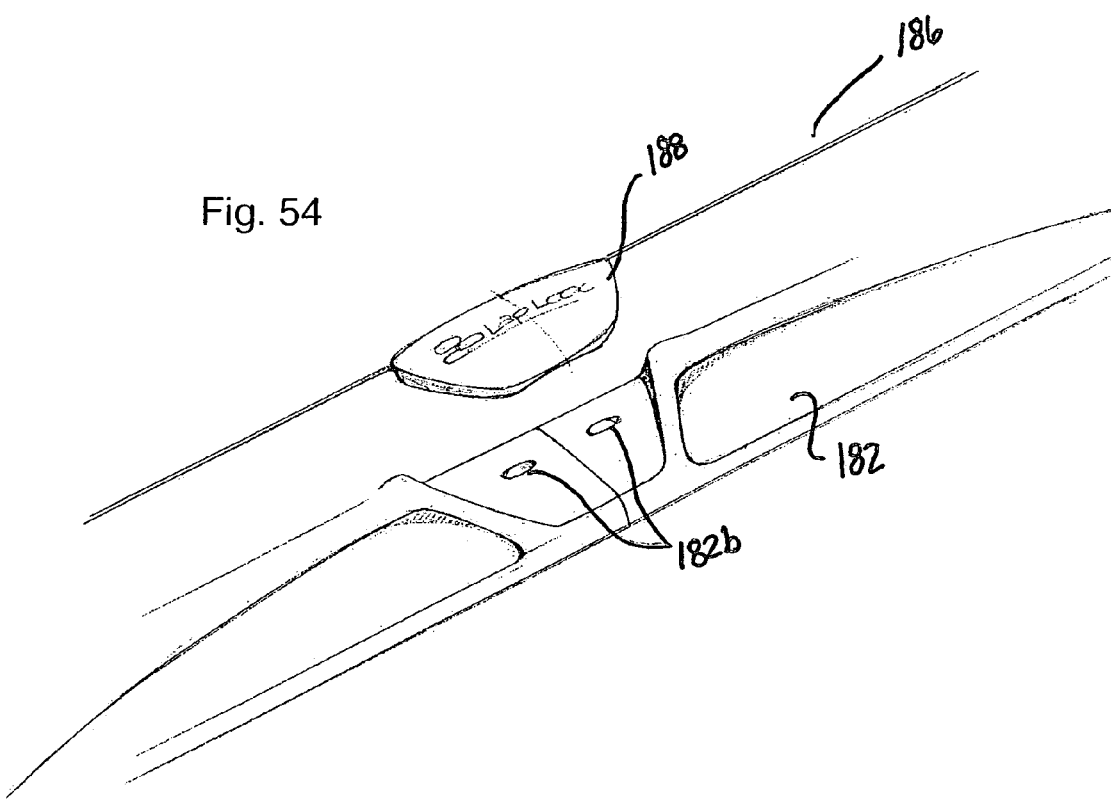
FIG. 54 is an alternative locking mechanism of the present invention.

FIG. 54 shows the locking mechanism 188 joined to the cover 186. Alternatively, as mentioned above, the cover 186 can be the image insert instead, and have the locking mechanism 186 joined thereto.

Figure 55:
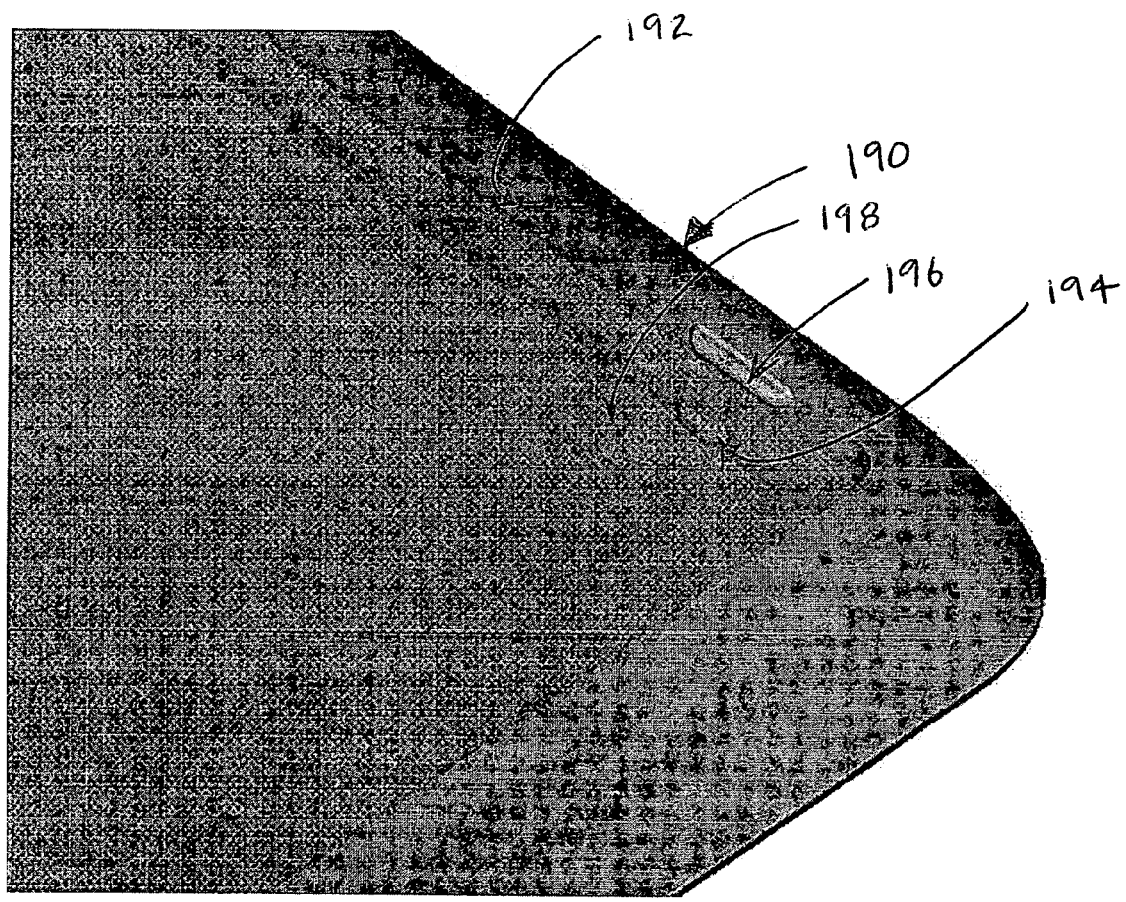
FIG. 55 is an perspective view of an alternative frame of the present invention.

Referring to FIG. 55, a partial first layer or frame 190 is shown. The frame 190 has an interior side wall 192 creating the compartment. A first frame projection 194 and a second frame projection 196 are shown projecting from the interior side wall 192. A plurality of first and second frame projections 194, 196 can project from the interior side wall 192 of the frame 190 for assisting in holding the second layer, image insert and/or cover within the compartment of the frame 190. Specifically, a plurality of first frame projections 194 can project from the interior side wall 192 at spaced intervals around the interior side wall 192, but all generally at the same height from the floor 198 of the compartment. The first projections 194 will assist in holding the image insert within the compartment through frictional engagement of the edge of the image inert with at least a portion of the surface of the first projections 194. In addition, a plurality of second frame projections 196 can project from the interior side wall 192 at spaced intervals around the interior side wall 192, but all generally at the same height from the floor 198 of the compartment, but further raised from the first projections 194 from the floor 198. The second projections 196 will assist in holding the cover within the compartment through frictional engagement of the edge of the cover with at least a portion of the surface of the second projections 196. These first and/or second projections can work alone or in combinations with other locking mechanisms and aspects of the present invention for securing and storing the image inserts and/or cover within the compartment and/or removably attached to the first layer and/or frame.

Figure 56:
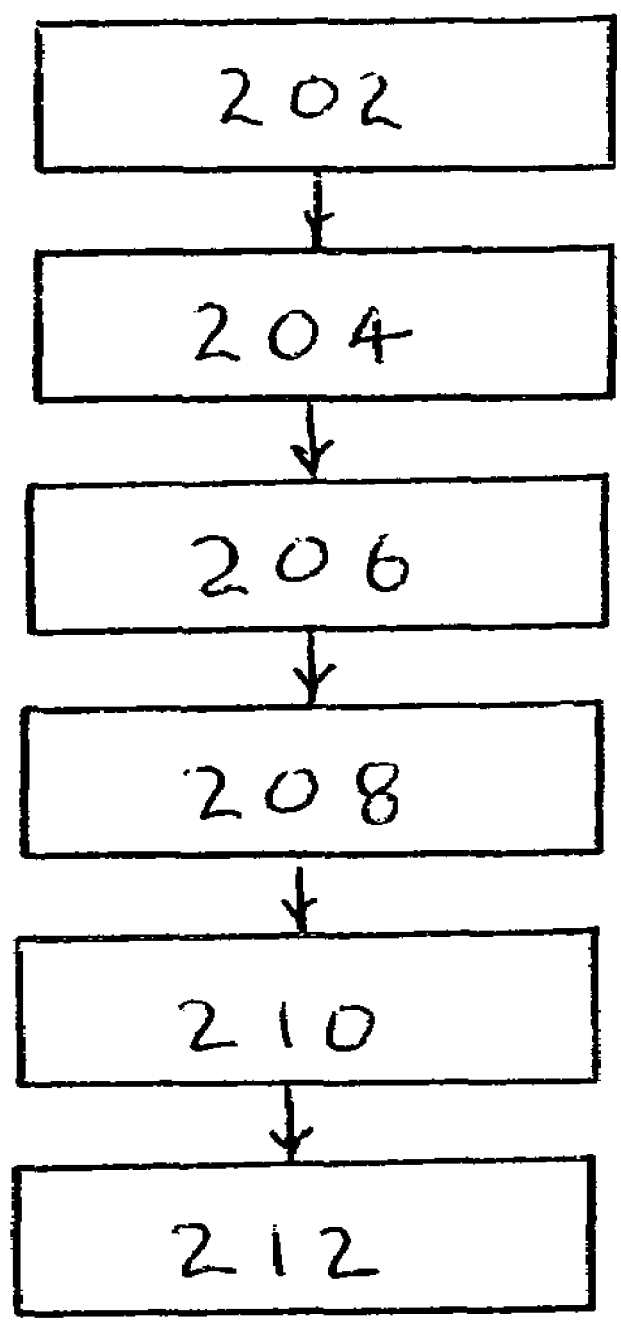
FIG. 56 is one embodiment of the method of the present invention.

The present invention is further directed to a method of creating an impression. This aspect of the invention can take several forms. These methods utilize one or more of the previous embodiment of the image display apparatus. In particular, the image display apparatus described above in various embodiments comprises a frame, an adhesive attached to the frame for removeably attaching the frame to a back side of a display housing of a laptop computer. The image display further comprises an image insert for insertion into the frame. Referring to FIG. 56, in one embodiment of the invention, the method comprises several steps which can be performed by an individual on his or her own, or through one or more personnel of a company, such as a sales person(s). The method comprises the step of providing, using, and/or starting 202 with a laptop computer. This may be done by purchasing a laptop, acquiring a laptop through company assignment, or through some other provision. For example, a company may provide a laptop computer to one of more of its salesman. An image display may be provided or used, and acquired by purchase one at a time or in bulk quantity through a providing step 204.

The image display is attached to the back side of the display housing of the laptop computer through an attaching step 206. The frame of the image display is attached to the back side of the display housing of the laptop computer using the adhesive, as is described within this specification above. The image display may be attached to the back side of the display housing of the laptop by the user of the laptop, by an information technology employee of a company, by an assistant within a sales force of a company, or by any other person or entity involved in the process of the creation of the impression. The user of the laptop computer may receive or be provided with the laptop after the image display is already attached to the back side of the display housing of the laptop computer. For example, if laptops are provided to a sales force within a company, information technology or other personnel within the company can attach the image display to the laptops prior to receipt by the users or sales force. The sales personnel or force can transport the laptop computer to a location where the target audience, such as a potential customer, is located. The sales force can then reveal the laptop computer from a computer case, and place the laptop computer on a surface near the target audience.

When attempting to create an impression, selection of the image insert to be inserted in the frame is significant, and can be performed through a selecting step 208. Depending on the impression which the user of the computer or entity which controls or instructs the user of the computer, a different image insert may be used. Image inserts can have images of varying types, sizes, colors, and designs, such as trademarks, service marks, and/or slogans used with or in relation to a product and/or service. Images of a product itself can be used within an image on an image insert. Alternatively, an image insert having a "white board" type surface can be used to create an impression by using the white board before or after display of the image insert to the target audience. The indicia which attempts to create the impression can be directly printed on a sheet used to create the image insert. The sheet can be a sheet of paper, a sheet of cardboard, a sheet of photographic paper, a poster board sheet, a white board, or some other sheet upon which an image can be printed. Alternatively or in addition to having an image printed on a sheet, stickers can be attached to the sheet to create or assist in creating the impression. Thus, the image insert with an image thereon is selected for deciding which image insert to insert into the frame based on the target audience that image is directed toward.

A user can carry with them a plurality of different image inserts, each having a different image thereon, for insertion into the frame, for creating the impression. The frame itself can hold the plurality of image inserts, typically with only the outer most image insert being visible from outside the frame, looking toward the back side of the display housing of the laptop computer. Alternatively, for example, two half size image inserts could be used next to one another, with both image inserts being visible from outside the frame, looking toward the back side of the display housing of the laptop computer. In either case, underneath the one or more visible image inserts can be other image inserts stored to later use, and being available to select from.

The target audience will have various attributes. The target audience can be one or more persons. The target audience can be a group of people having a similar set of attributes. The attributes can include for example, what the target audience might be interested in, such as a hobby, cause, movement, particular sport, and/or art form. Other attributes can include, for example, what products and/or services the customer might be interested in buying or using (personally, on behalf of their employer, and/or affiliated entity which they are reporting to), their age, their sex, their nationality, their religion, their residence, their interests, and/or any other demographic information about the target audience. Thus, as an example, the target audience or potential customer can be a retailer and/or a service provider of the product and/or service, respectively, which will be depicted within the image indicia. The attributes can also include, for example this type of demographic information about the target audience's actual or potential customers, and one or both of their affiliated groups, causes, and/or movements, and/or the purposes of these groups, causes, and/or movements. For example, the target audience may be a "support the military" group, with their purpose being to take actions to disseminate information which will cause others to positively view the military and what the military is achieving for the country. The target audience could be the group itself and/or the individuals or groups which may wish to sell products and/or services to such groups. The attributes could be the purpose of such group, the demographic information about individuals which take part the group, the purpose of the individuals and/or groups which may want to sell products and/or services to such groups, and/or the demographic information about the individuals and/or groups which may want to sell products and/or services to such groups.

As indicated above, the user of the computer or other individual(s) will select the image insert to be used within the frame for the target audience. As described, the target audience can be one or more potential customers, and the selection of the image insert can include selecting an image insert having image indicia thereon which depicts a product and/or service which the potential customer(s) may wish to purchase. It should be understood that a group or set of image inserts may be designated by an individual or group of individuals (other than the use or including the user in a group setting), as being appropriate for a particular target audience (one target or group of targets). The individual or individuals may limited usage of, and even access to, the image inserts by decision and/or through the use of computer systems and networks, as will be described further below. For example, a manager or managers in a sales team of force of a company may designate a particular image insert to use for certain potential customers or a group of potential customers, and the sales could either choose to use others or be limited to the manager selection or designation.

Figure 57:
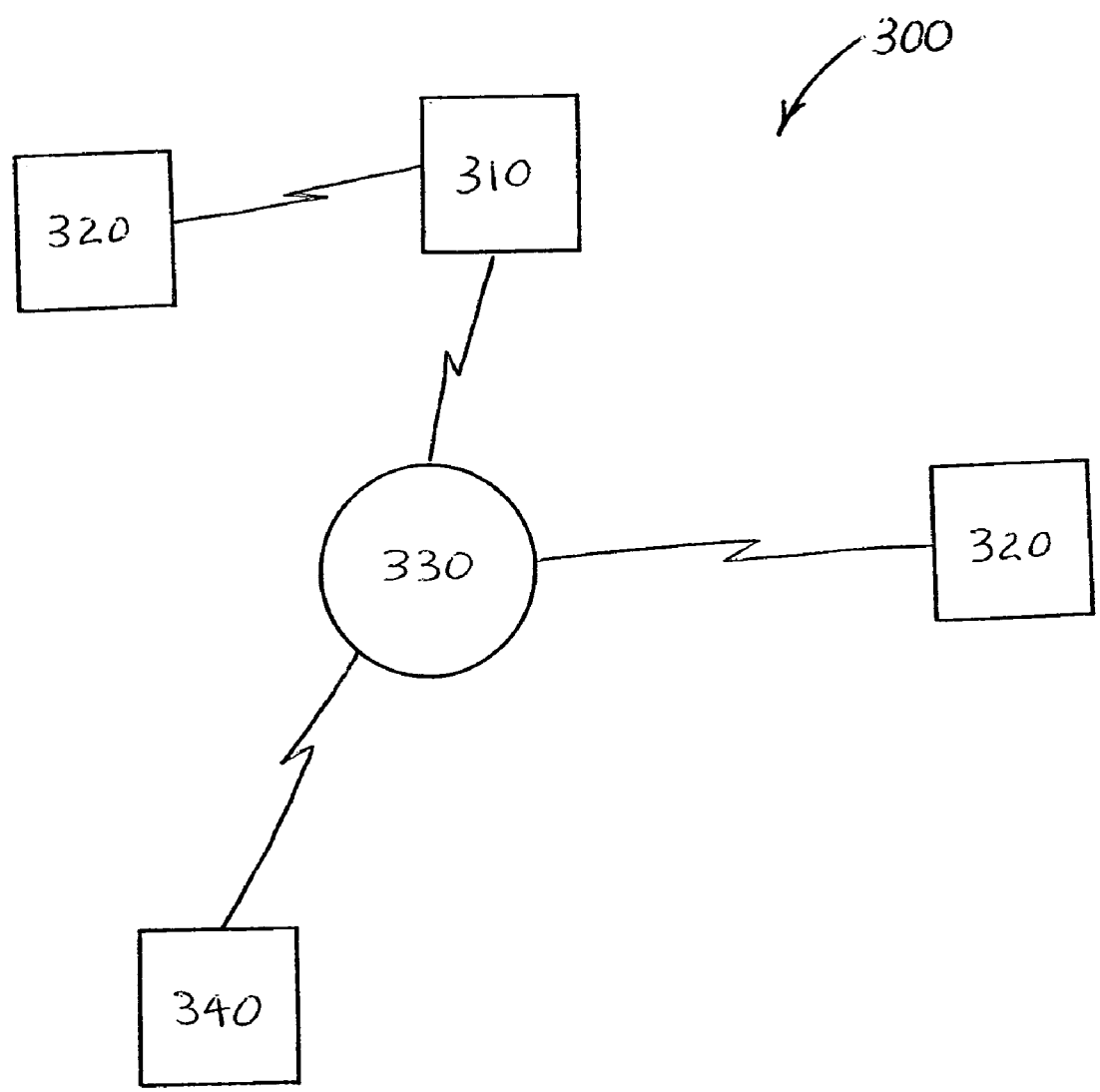
FIG. 57 is a computer network arrangement which may be used with the method and apparatus embodiments of the present invention.

When using a computer system 300 to access potential insert, as shown in FIG. 57, the salesman may be provided with one or more preferred images or image inserts to use with certain products, groups of products, services, groups of services, customers, groups of customers. Access to and/or ability to download may be limited for the images by identification information of certain salesman, as well, using known database and hierarchical access applications.

Once the selection process or step has occurred, the selected image insert is then inserted into the frame, through an inserting step 210. This can be done at various possible times, such as for example when a sales person is in their office prior to traveling to where a target customer located (in a conference room down the hall or to a city in a foreign country). This can also be done while actually meeting with a potential customer or target audience, although not necessarily as preferable as being done prior to such a meeting. Once the meeting occurs with a target audience, such as a target customer, the user of the laptop computer can open the display of the laptop computer to a generally vertical position, and face the selected image insert within the frame toward the target audience. This action and/or other possible actions, such as leaving the laptop computer unopened but facing upward, will allow the target audience to see the selected image insert within the frame on the back side of the display of the laptop, after revealing the laptop to the target audience. Thus, the laptop computer and the selected image insert within the frame will be displayed to the target audience, through a displaying step 212, and will create an impression with the selected image insert upon the target audience. It should be understood that when a "white board" type image insert is used the impression may not occur until after an image is drawn or printed onto the white board.

Referring again to FIG. 57, a network computer 310, for example a company server having a database therein, can be used to store a plurality of digital images. The digital images can be used to create one or more image inserts for use within the method of creating an impression. Users of the laptop computers can use the laptop computer 320 or some other computer 320 to download one or more of plurality of digital images from the network computer 310 over a computer network. Specifically, the laptop or other computer 320 can be used within LAN, WAN, VPN or other private network to access and/or download such images for use within an image insert. Alternatively, the laptop or other computer 320 can be used within the context of a global computer network 330, such as the Internet. Access to a downloading of the images can thus, occur from a remote location from the network computer 310. The remote location can be near where the target audience, such as a potential customer, is located. The user of the laptop computer or other computer 320 can then print the digital image onto a sheet, as one possible way of creating the image insert for use in creating the impression.

Access to the network computer 310 for posting appropriate images to create the impression will typically be controlled by a single entity, such as an individual, group of individuals, and/or a single corporation, by password or other security mechanisms and methods. As described above, the images may be stored in groups within the database, and password or other security access can be used to limited access and/or downloading of such images and groups of images within the database. For example, a set of images may be available to the sales personnel or force of one product and/or service of an entity, but not for other sales personnel or force or another product and/or service of an entity (such as a company). The network computer 310 can also list, for use by a sales person(s), which is image(s) is "preferred" for use with certain target audience members, by name(s), category(ies), and/or attribute(s) mentioned above. One way to use the present invention is download an image, print it onto a sheet of paper to create the image insert, and insert the image inert into the frame A clip can used to removeably secure or attach the image inert to the frame, as described in prior embodiments. An application service provider or off-site hosting service 340 can be used in place of or in addition to the network computer 310 to provide all or a portion of the functionality and/or information (including the digital images) of the network computer 310 discussed above.

In one form the invention, the method of can take the form of a method of marketing a product to a target customer using an image display. In addition to an entity providing the laptop computer with the image display attached to the back side of the display housing of the laptop computer to a sales person(s); the entity can communicate to the sales person(s) to select an image insert for inserting into the frame based on the product being marketed to the target customer. The entity can further communicate to the sales person(s) to insert the image insert selected into the frame, and communicate the sales person(s) to display the laptop computer and the image insert selected within the frame to the target customer for creating an impression with the image insert selected upon the target customer.

While the specific embodiments have been illustrated and described, numerous modifications come to mind without significantly departing from the spirit of the invention, and the scope of protection is only limited by the scope of the accompanying Claims.

What is claimed is:

1. An impression creating device for a laptop computer, comprising:
    an impression creating sheet having an image thereon for creating an impression;
    a frame for receiving the impression creating sheet, the frame including a generally planar contact surface for adhering to a generally smooth flat exposed front surface of a laptop computer cover panel; and,
    an adhesive on the contact surface of the frame for attaching the frame to the exposed front surface of the laptop computer cover panel.

2. The device of claim 1, wherein the impression creating sheet comprises means for attaching the sheet to the frame.

3. The device of claim 2, wherein the means for attaching the sheet to the frame comprises a translucent cover sheet having an interlocking member.

4. The device of claim 3, wherein the frame further comprises means for receiving the means for attaching, wherein the means for receiving comprises a plurality of recesses, and wherein the interlocking member comprises a plurality of protrusions, the plurality of recesses receiving the plurality of protrusions upon insertion of the cover sheet into the frame.

5. The device of claim 4 wherein the frame has an outer perimeter spaced inwardly from a peripheral edge of the cover panel.

6. The device of claim 1, wherein the frame comprises means for receiving and locking the sheet into the frame.

7. The device of claim 6, wherein the means for receiving and locking comprises a plurality of groove creating protrusions spaced along an interior wall of the frame.

8. The device of claim 1 wherein the frame is formed from a flexible material.

9. An enhancement device for a laptop computer, the laptop computer comprising a display having a outer cover panel and a screen, the outer cover panel having an exposed outer surface, the display hinged to a body member housing a keyboard, the screen and the keyboard being visible when the display is opened, the cover panel having a peripheral edge, the enhancement comprising:
- a frame for attaching to the exposed outer surface of the cover panel, the frame having a raised peripheral border at least partially surrounding a compartment and a contacting surface for adhering to the exposed outer surface of the cover panel;
- an adhesive attached to the contacting surface of the frame for attaching the frame to the exposed outer surface of the cover panel; and, an impression creating layer for insertion into the compartment.

10. The device of claim 9 further comprising a cover at least a portion of which is translucent, for overlaying at least a portion of the impression creating layer.

11. The device of claim 10, wherein the impression creating layer is a sheet.

12. The device of claim 10, wherein the translucent cover is integrally joined to the frame to form a unitary body.

13. The device of claim 10, wherein the translucent cover is hingedly connected to the frame.

14. The device of claim 10, wherein the translucent cover comprises a first connector and the frame comprises a second connector, wherein the first and second connectors can frictionally engage one another to secure the translucent cover to the frame.

15. The device claim 14, wherein one of the first or second connectors is an outwardly extending key, and the other of the first and second connectors is a keyhole, said key fitting within the keyhole to engaging the keyhole.

16. The device of claim 10 further comprising a locking means for engaging the cover and the frame to one another, and for securing the cover to the frame.

17. The device of claim 16, wherein the locking means is hingedly connected to one of the cover and the frame.

18. The device of claim 10 wherein the cover is clear.

19. The device of claim 9 wherein the frame further comprises a flat sheet center portion between the raised peripheral border.

20. The device of claim 9, wherein the frame further comprises a removable end cap for accessing the compartment.

21. The device of claim 9, wherein the border of the frame comprises a radially inwardly projecting ledge, wherein the impression creating layer is supported by the ledge.

22. The device of claim 9, wherein the border comprises a slot adapted for receiving the impression creating layer.

23. The device of claim 9 wherein the frame is formed from a flexible material.

* * * * *